(12) United States Patent
Rabin et al.

(10) Patent No.: US 10,715,793 B1
(45) Date of Patent: Jul. 14, 2020

(54) TWO DIMENSIONAL TO THREE DIMENSIONAL MOVING IMAGE CONVERTER

(71) Applicant: Steven M. Hoffberg, West Harrison, NY (US)

(72) Inventors: Gregory S. Rabin, Boston, MA (US); Steven M. Hoffberg, West Harrison, NY (US)

(73) Assignee: Steven M. Hoffberg, West Harrison, NY (US)

( * ) Notice: Subject to any disclaimer, the term of this patent is extended or adjusted under 35 U.S.C. 154(b) by 51 days.

(21) Appl. No.: 16/025,347

(22) Filed: Jul. 2, 2018

Related U.S. Application Data

(63) Continuation of application No. 14/733,224, filed on Jun. 8, 2015, now Pat. No. 10,015,478, which is a
(Continued)

(51) Int. Cl.

| | |
|---|---|
| *H04N 13/356* | (2018.01) |
| *H04N 13/264* | (2018.01) |
| *G06T 17/00* | (2006.01) |
| *G06K 9/62* | (2006.01) |
| *G06K 9/46* | (2006.01) |
| *H04N 13/246* | (2018.01) |
| *G06T 7/50* | (2017.01) |
| *G06K 9/74* | (2006.01) |
| *G06K 9/00* | (2006.01) |

(Continued)

(52) U.S. Cl.
CPC ......... *H04N 13/356* (2018.05); *G06F 16/583* (2019.01); *G06K 9/00201* (2013.01); *G06K 9/4604* (2013.01); *G06K 9/6267* (2013.01); *G06K 9/741* (2013.01); *G06T 7/50* (2017.01); *G06T 17/00* (2013.01); *G06T 19/00* (2013.01); *H04N 13/246* (2018.05); *H04N 13/264* (2018.05); *G06T 2207/10021* (2013.01)

(58) Field of Classification Search
None
See application file for complete search history.

(56) References Cited

U.S. PATENT DOCUMENTS

| | | | |
|---|---|---|---|
| 6,252,974 B1 * | 6/2001 | Martens | ................... G06T 7/262 382/107 |
| 8,411,126 B2 * | 4/2013 | Lee | .......................... H04N 7/15 348/14.01 |

(Continued)

*Primary Examiner* — Jason A Pringle-Parker
(74) *Attorney, Agent, or Firm* — Hoffberg & Associates; Steven M. Hoffberg

(57) ABSTRACT

The inventive method involves receiving as input a representation of an ordered set of two dimensional images. The ordered set of two dimensional images is analyzed to determine at least one first view of an object in at least two dimensions and at least one motion vector. The next step is analyzing the combination of the first view of the object in at least two dimensions, the motion vector, and the ordered set of two dimensional images to determine at least a second view of the object; generating a three dimensional representation of the ordered set of two dimensional images on the basis of at least the first view of the object and the second view of the object. Finally, the method involves providing indicia of the three dimensional representation as an output.

20 Claims, 19 Drawing Sheets

Related U.S. Application Data continuation of application No. 13/161,866, filed on Jun. 16, 2011, now Pat. No. 9,053,562.

(60) Provisional application No. 61/358,244, filed on Jun. 24, 2010.

(51) Int. Cl.
*G06T 19/00* (2011.01)
*G06F 16/583* (2019.01)

(56) References Cited

U.S. PATENT DOCUMENTS

| | | | | |
|---|---|---|---|---|
| 2004/0141622 A1* | 7/2004 | Squibbs | ............... | H04S 7/40 |
| | | | | 381/61 |
| 2010/0272417 A1* | 10/2010 | Nagasawa | ............ | H04N 13/178 |
| | | | | 386/341 |
| 2010/0328423 A1* | 12/2010 | Etter | ............... | H04N 7/142 |
| | | | | 348/14.16 |
| 2011/0007915 A1* | 1/2011 | Park | ............... | H04N 5/607 |
| | | | | 381/306 |
| 2011/0109798 A1* | 5/2011 | McReynolds | ............ | H04S 7/30 |
| | | | | 348/485 |

* cited by examiner $$\begin{cases} \dfrac{1}{R_1} + \dfrac{1}{I_1} = \dfrac{1}{f} \\ \dfrac{1}{R_2} + \dfrac{1}{I_2} = \dfrac{1}{f} \\ \dfrac{H}{D_1} = \dfrac{R_1}{I_1} \\ \dfrac{H}{D_2} = \dfrac{R_2}{I_2} \end{cases} \quad (1)$$

$$R_2 = \dfrac{D_1(D_2 + H)}{H(D_2 - D_1)} L \quad (2)$$

$$R_2 = \dfrac{D_1}{D_2 - D_1} L \quad (3)$$

$$\Phi(u_i, v_j) = \sum_q \sum_p \left( I_t(x_i + p, y_j + q) - I_{t+1}(u_i + p, v_j + q) \right)^2 \quad (4)$$

$$\begin{aligned} f(x) &= \sum_{j=0}^{n} f(x_j) L_j(x) \\ L_j(x) &= \dfrac{\prod_{i=0, i \neq j}^{n} (x - x_i)}{\prod_{i=0, i \neq j}^{n} (x_j - x_i)} \end{aligned} \quad (5)$$

FIG. 5

$$m(x,y) = \frac{I_{S_y}(x,y)}{I_{S_x}(x,y)} \quad (1)$$

$$q(x,y) = y - m(x,y) \cdot x \quad (2)$$

$$ACC[m,q] = Acc[m,q] + 1 \quad (3)$$

$$B:(D+P) = M:P \quad (4)$$

$$M = F\{B, N, depth\_value\} \quad (5)$$

$$P = G\{D, B, M\} \quad (6)$$

$$parallax = M * \left(1 - \frac{depth\_value}{255}\right) \quad (7)$$

Table 1: Rules to generate gradient planes

Left Case
- $Xvp <= 0$
- $(H/W) * Xvp < Yvp < -(H/W) * Xvp + H$

Right Case
- $Xvp >= W-1$
- $-(H/W) * Xvp + H - 1 < Yvp < (H/W) * Xvp$

Up Case
- $Yvp <= 0$
- $(W/H) * Yvp <= Xvp <= (W/H) * (H - Yvp)$

Down Case
- $Yvp >= H-1$
- $(W/H) * (H - 1 - Yvp) <= Xvp <= (W/H) * Yvp$

Inside Case
- $0 < Xvp < W$
- $0 < Yvp < H$ where:

$(Xvp, Yvp)$ = vanishing point coordinates;
$H, W$ = image size

Fig. 8A Prior Art

Table 2: Rules to generate the depth level

Horizontal gradient plane:

$$D_{min} = \min\left|\frac{y-q_1}{m_1} - \frac{y-q_2}{m_2}\right|$$

$$D_{max} = \max\left|\frac{y-q_1}{m_1} - \frac{y-q_2}{m_2}\right|$$

$$0 \leq \frac{y-q_1}{m_1} \leq W-1 \qquad 0 \leq \frac{y-q_2}{m_2} \leq W-1$$

Vertical gradient plane:

$$D_{min} = \min\left|(m_1 - m_2)\cdot x + q_1 - q_2\right|$$
$$D_{min} = \max\left|(m_1 - m_2)\cdot x + q_1 - q_2\right|$$

$$0 \leq m_1 \cdot x + q_1 \leq H-1$$
$$0 \leq m_2 \cdot x + q_2 \leq H-1$$

where
$q_1$ and $q_2$ are the intersection with the boundaries image plane and $$D_1 = D_{min} + \frac{D_{max} - D_{min}}{16}$$

$$D_2 = D_{min} + \frac{D_{max} - D_{min}}{8}$$

$$D_3 = D_{min} + \frac{D_{max} - D_{min}}{4}$$

Fig. 8B Prior Art

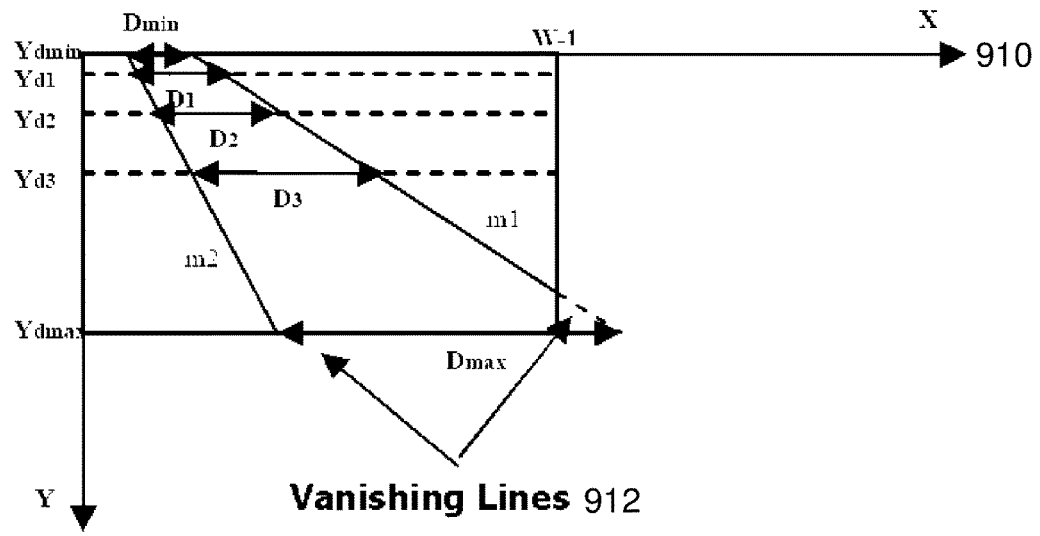
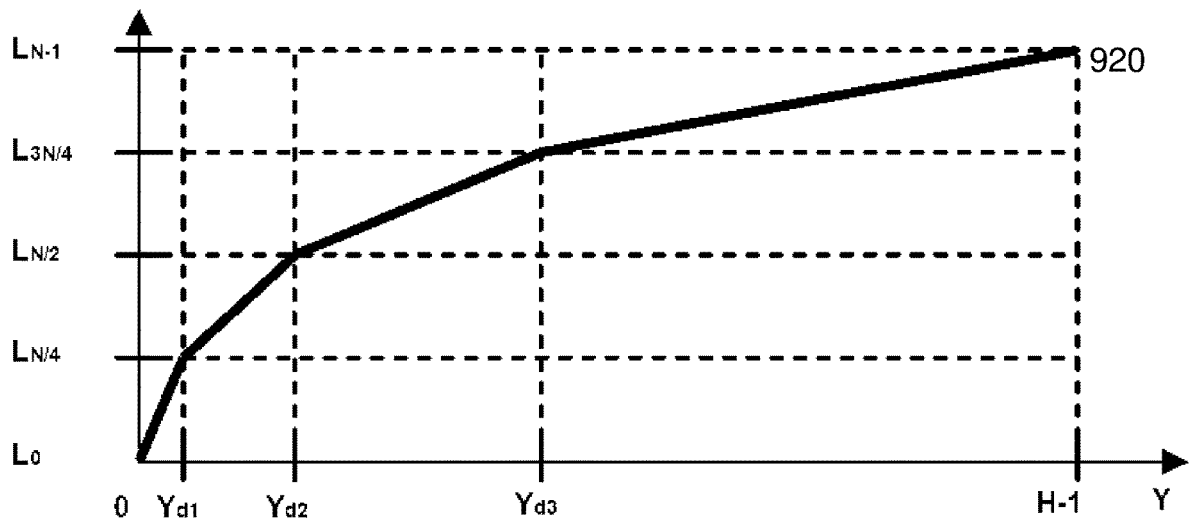
Fig. 9

1210 Processor receives as input a representation of an ordered set of two dimensional images, such as a video.

1220 Processor analyzing the ordered set of two dimensional images to determine:
    1222 A first view of an object in two dimensions, and
    1224 A motion vector.

1230 Processor analyzes the combination of the first view of the object in two dimensions and one dimension of time, the motion vector, and the ordered set of two dimensional images to determine:
    1232 A second view of the object.

1240 Processor generates a three dimensional representation of the ordered set of two dimensional images based on at least the first view of the object and the second view of the object.

1250 Processor predicts a shape and color of at least one object that is not visible in the two dimensional image but is visible in the three dimensional model on the basis of at least one of an Internet lookup, a database lookup, and a table lookup.

1260 Processor provides as output an indicia of the three dimensional representation.

Fig. 12

TWO DIMENSIONAL TO THREE DIMENSIONAL MOVING IMAGE CONVERTER

CROSS REFERENCE TO RELATED APPLICATIONS

The present application is Continuation of U.S. patent application Ser. No. 14/733,224, filed Jun. 8, 2015, now U.S. Pat. No. 10,015,478, issued Jul. 3, 2018, which is a Continuation of U.S. patent application Ser. No. 13/161,866, filed Jun. 16, 2011, now U.S. Pat. No. 9,053,562, issued Jun. 9, 2015, which claims benefit of priority under 35 U.S.C. § 119(e) to U.S. Provisional Patent Application No. 61/358,244, filed Jun. 24, 2010, which are each expressly incorporated herein by reference in their entirety.

FIELD OF THE INVENTION

This invention relates to a two dimensional to three dimensional motion image converter. It is useful, for example, for viewing arbitrary two dimensional cable programs or arbitrary DVDs or video cassette in three dimensions on a three dimensional television.

BACKGROUND OF THE INVENTION

The simplest modern televisions are two dimensional. These televisions consist of a screen and a means for connecting to a cable or similar broadcast network, as well as means for connecting to the internet and means for connecting to a laptop or desktop to view online streaming videos. However, recently, several advanced televisions have been developed.

For example, three dimensional televisions, such as the 3D HDTV manufactured by Samsung Corporation, optimize the viewing experience of 3d videos. However, there are relatively few movies that are designed to be viewed in 3d, as opposed to the plethora of traditional videos available. Also, currently available cable, and telephone company based broadcast services do not provide any 3d content, thereby reducing the value to the user of 3d televisions.

A 3D television system and method is described in detail in US App. 2005/0185711, incorporated herein by reference. See also US App. 2006/0007301, US App. 2006/0184966, U.S. Pat. No. 4,740,836, expressly incorporated herein by reference. 3D images can be generated if a 3D model of the environment exists. See, e.g., US App. 2006/0061651, incorporated herein by reference. These images could be used in 3D video games or movies.

Other 3D imaging techniques are known in the art and used in a broad range of fields ranging from medicine to architecture. See, e.g., US App. Nos. 20090128551; 20090141024; 20090144173; 20090146657; 20090148070; 20090153553; 20090154794; 20090161944; 20090161989; 20090164339; 20090167595; 20090169076; 20090179896; 20090181769; 20090184349; 20090185750; 20090189889; 20090195640; 20090213113; 20090237327; 20090262108; 20090262184; 20090272015; 20090273601; 20090279756; 20090295801; 20090295805; 20090297010; 20090297011; 20090310216; 20090315979; 20090322742; 20100007659; 20100026789; 20100026909; 20100034450; 20100039573; 20100045696; 20100060857; 20100061603; 20100063992; 20100085358; 20100086099; 20100091354; 20100097374; 20100110070; 20100110162; 20100118125; 20100123716; 20100124368; and U.S. Pat. Nos. 7,719,552; 7,715,609; 7,712,961; 7,710,115; 7,702,064; 7,699,782; 7,697,748; 7,693,318; 7,692,650; and 7,689,019; all expressly incorporated herein by reference.

Many different automatic pattern recognition techniques are also known in the art. See, e.g., US App. 2010/0121798; US App. 2010/0115347; US App. 2010/0099198; US App. 2010/0092075; US App. 2010/0082299; US App. 2010/0061598; US App. 2010/0047811; US App. 2010/0046796; US App. 2010/0045461; US App. 2010/0034469; US App. 2010/0027611; US App. 2010/0027606; US App. 2010/0026642; US App. 2010/0016750; US App. 2009/0326841; US App. 2009/0324107; US App. 2009/0297021; US App. 2009/0297000; US App. 2009/0290800; US App. 2009/0290788; US App. 2009/0287624; US App. 2009/0268964; US App. 2009/0254496; US App. 2009/0232399; US App. 2009/0226183; US App. 2009/0220155; US App. 2009/0208112; US App. 2009/0169118; US App. 2009/0152356; US App. 2009/0149156; US App. 2009/0144213; US App. 2009/0122979; US App. 2009/0087084; US App. 2009/0087040; US App. 2009/0080778; US App. 2009/0080757; US App. 2009/0076347; US App. 2009/0049890; US App. 2009/0035869; US App. 2009/0034366; US App. 2009/0010529; US App. 2009/0006101; US App. 2008/0319568; US App. 2008/0317350; US App. 2008/0281591; US App. 2008/0273173; US App. 2008/0270338; US App. 2008/0270335; US App. 2008/0256130; US App. 2008/0246622; U.S. Pat. Nos. 7,707,128; 7,702,599; U.S. Pat. Nos. 7,702,155; 7,697,765; 7,693,333; 7,689,588; 7,685,042; 7,684,934; 7,684,623; and 7,677,295; all expressly incorporated herein by reference.

In addition, Commons teaches a hierarchal stacked neural network that is useful in pattern recognition in U.S. Pat. No. 7,613,663, incorporated herein by reference.

Video cards or graphics cards, which separate graphics processing from the CPU in laptop and desktop computers, are also known in the art. Lower end video cards are recommended and function efficiently for simple computer use that is not graphics intensive, such as Word processing, reading email, and occasionally watching an online or computer-disk-based video. However, individuals who frequently play picture and video-based computer games frequently require more complex, higher end video cards. See en.wikipedia.org/wiki/Video_card, last accessed May 7, 2010, incorporated herein by reference, for a more detailed discussion of video card technology.

In single instruction multiple data (SIMD) technology, a computer with multiple processing elements performs the same operation on multiple data simultaneously. Many video cards use SIMD because similar transformations might need to occur to multiple pixels simultaneously. In old computers where the graphics processor is part of the central processing unit (CPU), SIMD is typically used for the graphics processing. Young, U.S. Pat. No. 6,429,903, incorporated herein by reference, describes a video card that is optimized by using shading techniques before ascertaining the color change on a pixel on the screen.

Several methods of 2D to 3D image conversion are known in the art. See, e.g., U.S. Pat. No. 7,573,475, expressly incorporated herein by reference. Many of these methods utilize techniques to review and analyze 2D images and employ algorithms to determine distance in the image by way of brightness, manual judgment, and rotoscoping algorithms. Thus, these methods are malconfigured for use in 3D televisions and often cannot convert images seamlessly and in real time, as required by many 3D television viewers. See also U.S. Pat. No. 7,573,489; US App. 2009/0322860; US App. 2008/0150945; US App. 2008/0101109;

US App. 2007/0279415; US App. 2007/0279412; and US App. 2004/0165776; each of which is expressly incorporated herein by reference.

Currently known methods of 2D to 3D conversion are not very practical, and filmmakers typically spend excessive amounts of financial and human resources to recreate 2D movies in 3D. For example, in spite of Disney's great investment of both talent in money in creating a 3D version of *Chicken Little*, the depth perception by viewers of the movie was still very poor. See, generally, Wikipedia: *Chicken Little* (2005 film), en.wikipedia.org/wiki/Chicken_Little_(2005_film), last accessed May 21, 2010, discussing the process of producing *Chicken Little*; and Dipert, Brian, "3-D Stop Motion: Well-Deserved Promotion," EDN, Oct. 31, 2007, discussing the poor viewer experience in the 3D version of *Chicken Little*.

Samsung Corporation provides a system and method for 2D to 3D conversion of substantially arbitrary television programs in the UN55C7000 1080p 3D LED HDTV. See www.samsung.com/us/consumer/tv-video/televisions/led-tv/UN55C7000WFXZA/index.idx?pagetype=prd_detail, last accessed Jun. 2, 2010. However, Samsung's system and method is not optimal because it has a high error rate, provides inconsistent images to the right eye and the left eye (where the user is wearing 3D glasses), and has a tendency to give viewers headaches and motion sickness or otherwise discomfort them. See, generally, mashable.com/2010/03/09/samsung-3d-tv-starter-kit/, last accessed Jun. 2, 2010. Samsung's patent application on the topic, US 2009/0237327, incorporated herein by reference, notes that the right eye signal in the glasses repeats part of the left eye signal. See also, US 2009/0290811, incorporated herein by reference.

3D televisions have the potential to improve viewer experience by providing an additional dimension in which viewers can view scenes. For example, viewing a 2D sportscast is a much lower quality experience than viewing a game in a stadium in part because the 2D TV viewer cannot appreciate depth. 3D TV has the potential to solve this problem. However, a major negative feature of 3D TVs is the lack of content. What is needed in the art is an effective system and method to convert substantially arbitrary content from two dimensions to three dimensions.

SUMMARY DESCRIPTION OF THE INVENTION

Due to the limited number of videos made in three dimensions, and the lack of cable or broadcast programs in three dimensions, the utility of a three dimensional television to a typical person is very limited. This invention proposes a method of changing a substantially arbitrary television program or recording into a viewing format that is optimized for a three dimensional screen. This would allow the users of three dimensional televisions to watch substantially arbitrary programs and videos in a format optimized for 3D viewing.

It is an object of the invention to provide a method comprising: receiving as input a representation of an ordered set of two dimensional images; analyzing the ordered set of two dimensional images to determine at least one first view of an object in at least two dimensions and at least one motion vector; analyzing the combination of the first view of the object in at least two dimensions, the motion vector, and the ordered set of two dimensional images to determine at least a second view of the object; generating a three dimensional representation of the ordered set of two dimensional images on the basis of at least the first view of the object and the second view of the object; and providing as output an indicia of the three dimensional representation.

Optionally, the ordered set of two dimensional images comprises a video. Optionally, at least one image in the ordered set of two dimensional images is taken by a single, stationary camera. Optionally, the motion vector corresponds to an object in the image. Optionally, a processing speed of the method is real-time.

Optionally, the method further comprises predicting a shape and color of at least one object that is not visible in the two dimensional image but is visible in the three dimensional model on the basis of at least one of an Internet lookup, a database lookup, and a table lookup.

It is an object of the invention to provide method comprising: receiving as input a two dimensional image taken by a camera; developing a depth representation of at least one object in the two dimensional image through the steps of: calculating an interpolation function for estimating the three dimensional position of items in the two dimensional image on the basis of at least an estimated height of the camera and an estimated angle relative to a horizontal plane of the camera, using said interpolation function to calculate a distance of the at least one object from the camera, and converting said distance of the at least one object from the camera into a depth of the at least one object in the scene; predicting a shape and color of at least a portion that is not visible in the two dimensional image of the at least one object on the basis of at least one of an Internet lookup, a database lookup, and a table lookup; converting said depth of the at least one object and said a shape and color of at least a portion that is not visible in the two dimensional image of the at least one object in the scene into a three dimensional model of said at least one object; and providing a representation of the three dimensional model of said at least one object.

Optionally, the interpolation function is one of a Newton divided difference interpolation function and a LaGrange interpolation function. Optionally, the two dimensional image is taken by a single, stationary camera. Optionally, a focal length of the camera is unknown. Optionally, a processing speed of the method is real-time. Optionally, the three dimensional model is expressed in a format configured to be displayed on a three dimensional screen.

It is an object of the invention to provide a method comprising: receiving a representation of a two dimensional image; classifying at least one region of the two dimensional image; extracting at least one vanishing line and at least one vanishing point from the two dimensional image; extracting at least one depth gradient in the image on the basis of at least one of said at least one vanishing line and said at least one vanishing point; predicting a shape and color of at least one object that is not visible in the two dimensional image but is visible in the three dimensional model on the basis of at least one of an Internet lookup, a database lookup, and a table lookup; creating a three dimensional model of at least a portion of the two dimensional image on the basis of said at least one depth gradient and said prediction of a shape and color of at least one object; and providing the three dimensional model of at least a portion of the two dimensional image.

Optionally, the at least one region of the two dimensional image is one of sky, land, floor, and wall. Optionally, the extraction of at least one vanishing line and at least one vanishing point is on the basis of whether the image is an indoor image, an outdoor image with geometric features, or an outdoor image without geometric features. Optionally, the three dimensional model is expressed in a format configured to be displayed on a three dimensional screen. Optionally, the two dimensional image is taken by a single, stationary camera. Optionally, a processing speed of the method is real-time.

It is an object of the invention to provide a method of presenting a three dimensional film to a viewer comprising: calculating a distance and an angle from the viewer to a screen; applying at least one transform to a representation of a scene to produce a three dimensional model corresponding to the distance and the angle from the viewer to the screen; and presenting on the screen a three dimensional image corresponding to the three dimensional model.

Optionally, at least one of the distance and the angle from the viewer to the screen is calculated on the basis of an article of clothing or an accessory worn by the viewer. Optionally, at least one of the distance and the angle from the viewer to the screen is calculated on the basis of at least one image taken by a camera connected to the screen. Optionally, at least one of the distance and the angle from the viewer to the screen is calculated on the basis of camera parameters. Optionally, at least one of the distance and the angle from the viewer to the screen is calculated on the basis of image parameters not related to the camera. Optionally, the at least one transform is a 2D to 3D transform. Optionally, the at least one transform is a 3D to 3D transform. Optionally, a processing speed of the method is real-time. Optionally, the screen is configured to be used as a touch screen.

Other embodiments of the invention involve at least one processor and a non-transitory computer readable medium with instructions for the same.

It is an object to provide a method, and system for carrying out that method, and a computer readable medium storing instructions adapted for controlling as programmable processor to carry out the method, comprising: receiving as input a representation of an ordered set of images; analyzing the ordered set of images to determine at least one first view of an object in at least two dimensions; automatically identifying the object and obtaining information extrinsic to the ordered set of two dimensional images describing the object; analyzing the combination of the first view of the object in at least two dimensions, and the information describing the object, to infer a state of a hidden surface in the ordered set of two dimensional images; and generating an output representing the object and at least a portion of the hidden surface.

The ordered set of two dimensional images may comprise a video, e.g., a compressed digital video file such as MPEG-1, MPEG-2, MPEG-4, etc.

The at least one image in the ordered set of two dimensional images may be taken by a single, stationary camera. The object may be associated with a motion vector automatically extracted from the ordered set of images. The object may be identified by image pattern recognition. The object may be identified by metadata within an information stream accompanying ordered set of two dimensional images.

It is also an object to provide a method, and system for carrying out that method, and a computer readable medium storing instructions adapted for controlling as programmable processor to carry out the method, comprising: receiving as input an image; developing a depth representation of at least one object in the image, comprising: calculating an interpolation function for estimating the three dimensional position of items in the two dimensional image on the basis of at least an estimated height of the camera and an estimated angle relative to a horizontal plane of the camera, using said interpolation function to calculate a distance of the at least one object from the camera, and converting said distance of the at least one object from the camera into a depth of the at least one object in the scene; predicting a shape and color of at least a portion that is not visible in the two dimensional image of the at least one object on the basis of at least one of an Internet lookup, a database lookup, and a table lookup; converting said depth of the at least one object and said a shape and color of at least a portion that is not visible in the two dimensional image of the at least one object in the scene into a three dimensional model of said at least one object; and storing in memory a representation of the three dimensional model of said at least one object.

The interpolation function may be one of a Newton divided difference interpolation function and a LaGrange interpolation function.

The two dimensional image may be taken by a single camera, multiple cameras, and/or stationary or moving camera(s). The focal length of the camera may be known or unknown, or vary (zoom) between the various images.

The processing speed of the method is real-time.

The three dimensional model may be expressed in a format configured to be displayed on a three dimensional screen.

It is further an object to provide a method, and system for carrying out that method, and a computer readable medium storing instructions adapted for controlling as programmable processor to carry out the method, comprising: receiving a representation of a two dimensional image; classifying at least one region of the two dimensional image; extracting at least one vanishing line and at least one vanishing point from the two dimensional image; extracting at least one depth gradient in the image on the basis of at least one of said at least one vanishing line and said at least one vanishing point; predicting a shape and color of at least one object that is not visible in the two dimensional image but is visible in the three dimensional model on the basis of at least one of an Internet lookup, a database lookup, and a table lookup; creating a three dimensional model of at least a portion of the two dimensional image on the basis of said at least one depth gradient and said prediction of a shape and color of at least one object; and storing in a memory the three dimensional model of at least a portion of the two dimensional image.

The at least one region of the two dimensional image may be one of sky, land, floor, or wall. The extraction of at least one vanishing line and at least one vanishing point may be on the basis of whether the image is an indoor image, an outdoor image with geometric features, or an outdoor image without geometric features. The three dimensional model may be expressed in a format configured to be displayed on a three dimensional screen. The two dimensional image may be taken by a single, stationary camera. The processing speed may approach real-time, that is, the processing burden is within the capabilities of the processor to avoid generally increasing backlog, and the latency is sufficiently low to avoid a lag that is disruptive to the user.

It is another object to provide at least one processor comprising: an input for receiving a representation of an ordered set of two dimensional images; a memory comprising computer instructions for analyzing the ordered set of two dimensional images to determine at least one first view of an object in at least two dimensions and at least one motion vector; a memory comprising computer instructions for analyzing the combination of the first view of the object in at least two dimensions, the motion vector, and the ordered set of two dimensional images to determine at least a second view of the object; a memory comprising computer instructions for generating a three dimensional representation of the ordered set of two dimensional images on the basis of at least the first view of the object and the second view of the object; and an output providing an indicia of the three dimensional representation. The ordered set of two dimensional images may comprise a video. At least one image in the ordered set of two dimensional images may be taken by a single, stationary camera. The motion vector may correspond to an object in the image. The at least one processor may be configured to operate in real-time.

The processor may further comprise a predictor for a shape and color of at least one object that is not visible in the image but is visible in the three dimensional model on the basis of image pattern recognition.

It is a still further object to provide at least one processor comprising: an input for receiving an image; a memory comprising computer instructions for developing a depth representation of at least one first object in the image comprising: computer instructions for calculating an interpolation function for estimating the three dimensional position of items in the two dimensional image on the basis of at least an estimated height of the camera and an estimated angle relative to a horizontal plane of the camera, computer instructions for using said interpolation function to calculate a distance of the at least one first object from the camera, and computer instructions for converting said distance of the at least one object from the camera into a depth of the at least one first object in the scene; a predictor for a shape and color of at least a portion that is not visible in the two dimensional image of the at least one object on the basis of at least one of an Internet lookup, a database lookup, and a table lookup; a memory comprising computer instructions for converting said depth of the at least one object and said a shape and color of at least a portion that is not visible in the two dimensional image of the at least one object in the scene into a three dimensional model of said at least one object; and an output for providing a representation of the three dimensional model of said at least one object.

The interpolation function may be one of a Newton divided difference interpolation function and a LaGrange interpolation function. The image may be taken by a single, two dimensional camera. The processor in some cases may operate without the focal length of the camera being provided. The at least one processor may be configured to operate in real-time. The three dimensional model may be expressed in a format configured to be displayed on a three dimensional screen.

It is another object to provide at least one processor comprising: an input for receiving a representation of a two dimensional image; a memory configured to store: machine instructions for classifying at least one region of the two dimensional image; machine instructions for extracting at least one vanishing line and at least one vanishing point from the two dimensional image; machine instructions for extracting at least one depth gradient in the image on the basis of at least one of said at least one vanishing line and said at least one vanishing point; machine instructions for predicting a shape and color of at least one object that is not visible in the two dimensional image but is visible in the three dimensional model on the basis of at least one of an Internet lookup, a database lookup, and a table lookup; machine instructions for creating a three dimensional model of at least a portion of the two dimensional image on the basis of said at least one depth gradient and said prediction of a shape and color of at least one object; and an output for at least one of storing and providing the three dimensional model of at least a portion of the two dimensional image.

The at least one region of the two dimensional image may be one of sky, land, floor, and wall. The machine instructions for extracting at least one vanishing line and at least one vanishing point may operate on the basis of whether the image is an indoor image, an outdoor image with geometric features, or an outdoor image without geometric features. The three dimensional model may be expressed in a format configured to be displayed on a three dimensional screen. The image may be taken by a single, two dimensional camera. The at least one processor may be configured to operate in real-time.

Another object provides a non-transitory computer readable medium comprising instructions for: receiving as input a representation of an ordered set of images; analyzing the ordered set of images to determine at least one first view of an object in at least two dimensions; automatically identifying the object and obtaining information extrinsic to the ordered set of two dimensional images describing the object; analyzing the combination of the first view of the object in at least two dimensions, and the information describing the object, to infer a state of a hidden surface in the ordered set of two dimensional images; generating an output representing the object and at least a portion of the hidden surface. The ordered set of images may comprise a video. At least one image in the ordered set of two dimensional images may be taken by a single, two dimensional camera. The object may be associated with a motion vector automatically extracted from the ordered set of images. The object may be identified by image pattern recognition. The object may also be identified by metadata within an information stream accompanying ordered set of two dimensional images.

A further object provides a non-transitory computer readable medium comprising instructions for: receiving as input an image taken by a camera; developing a depth representation of at least one object in the image through the steps of: calculating an interpolation function for estimating the three dimensional position of items in the image on the basis of at least an estimated height of the camera and an estimated angle relative to a horizontal plane of the camera, using said interpolation function to calculate a distance of the at least one object from the camera, and converting said distance of the at least one object from the camera into a depth of the at least one object in the scene; predicting a shape and color of at least a portion that is not visible in the image of the at least one object by image pattern recognition; converting said depth of the at least one object and said a shape and color of at least a portion that is not visible in the two dimensional image of the at least one object in the scene into a three dimensional model of said at least one object; and providing a representation of the three dimensional model of said at least one object. The interpolation function may be one of a Newton divided difference interpolation function and a LaGrange interpolation function. The image may be taken by a single, stationary camera. A focal length of the camera may be provided or absent from an input signal. The instructions may be processed in real-time. The three dimensional model may be expressed in a format configured to be displayed on a three dimensional screen.

A still further object provides a non-transitory computer readable medium comprising instructions for: receiving a representation of an image; classifying at least one region of the image; extracting at least one vanishing line and at least one vanishing point from the image; extracting at least one depth gradient in the image on the basis of at least one of said at least one vanishing line and said at least one vanishing point; predicting a shape and color of at least one object that is not visible in the two dimensional image but is visible in the three dimensional model by image pattern recognition; creating a three dimensional model of at least a portion of the image on the basis of said at least one depth gradient and said prediction of a shape and color of at least one object; and providing the three dimensional model of at least a portion of the image.

The at least one region of the image may be one of sky, land, floor, and wall. The extraction of at least one vanishing line and at least one vanishing point may be on the basis of whether the image is an indoor image, an outdoor image with geometric features, or an outdoor image without geometric features. The three dimensional model may be expressed in a format configured to be displayed on a three dimensional screen. The two dimensional image may be taken by a single, stationary camera. The instructions may be processed in real-time.

Another object provides a method of presenting a three dimensional film to a viewer comprising: calculating a distance and an angle from the viewer to a screen; applying at least one transform to a representation of a scene to produce a three dimensional model corresponding to the distance and the angle from the viewer to the screen; and presenting on the screen a three dimensional image corresponding to the three dimensional model.

Another object provides at least one processor configured to present a three dimensional film to a viewer comprising: an input port configured to receive information representing at least a relative position of a viewer with respect to a display screen; a computational unit configured to calculate a distance and an angle from the viewer to the screen, to apply at least one transform to a representation of a scene to produce a three dimensional model corresponding to the distance and the angle from the viewer to the screen, and to generate an output signal representing a three dimensional image corresponding to the three dimensional model; and an output port configured to present the output signal.

A further object provides a non-transitory computer readable medium comprising instructions for presenting a three dimensional film to a viewer comprising: calculating a distance and an angle from the viewer to a screen; applying at least one transform to a representation of a scene to produce a three dimensional model corresponding to the distance and the angle from the viewer to the screen; and presenting on the screen a three dimensional image corresponding to the three dimensional model.

At least one of the distance and the angle from the viewer to the screen may be calculated on the basis of an article of clothing or an accessory worn by the viewer. At least one of the distance and the angle from the viewer to the screen may also be calculated on the basis of at least one image taken by a camera connected to the screen. At least one of the distance and the angle from the viewer to the screen may be calculated on the basis of camera parameters. At least one of the distance and the angle from the viewer to the screen may be calculated on the basis of image parameters not related to the camera.

The at least one transform may be a 2D to 3D transform and/or a 3D to 3D transform. A processing speed of the method may be real-time. The screen may be configured to be used as a touch screen.

A further object provides a system and method of converting a 2D video file to a 3D video file comprising: at least one of receiving and extracting sound data and image data from a 2D video file; calculating a characteristic delay of a sound in the 2D video file coming from a source in at least one image associated with the 2D video file; auto-correlating sound data associated with the 2D image file between channels; ascertaining amplitude and equalization features to calculate a likely position of a source of at least one sound in the 2D video file; and at least one of providing as output and storing in memory a representation of the likely position of the source of at least one sound in the 2D video file.

Another object provides a processor configured for converting a 2D video file to a 3D video file comprising: an input configured to at receive a 2D video file; a memory comprising computer instructions to extract sound and image data from the 2D video file; a memory comprising computer instructions to calculate a characteristic delay of a sound in the 2D video file coming from a source in at least one image associated with the 2D video file; a memory comprising computer instructions to auto-correlate sound data associated with the 2D image file between channels; a memory comprising computer instructions to ascertain amplitude and equalization features; a memory comprising computer instructions to calculate a likely position of a source of at least one sound in the 2D video file; and an output configured to provide a representation of the likely position of the source of at least one sound in the 2D video file.

A further object provides a non-transitory computer readable medium configured to convert a 2D video file to a 3D video file comprising computer instructions for: at least one of receiving and extracting sound data and image data from a 2D video file; calculating a characteristic delay of a sound in the 2D video file coming from a source in at least one image associated with the 2D video file; auto-correlating sound data associated with the 2D image file between channels; ascertaining amplitude and equalization features to calculate a likely position of a source of at least one sound in the 2D video file; and providing a representation of the likely position of the source of at least one sound in the 2D video file.

An output may be provided representing an error in the calculation in response to detecting at least one of an echo or an inconsistency between the sound data from the 2D video file and the image data from the 2D video file. The 2D video file may comprise a compressed digital video file, e.g., an MPEG-1, an MPEG-2, an MPEG-4, an MOV, a QT, a Divx, a Xvid, a WMV, a WMP, an FLV, and an h.264 format. The representation of the error may comprise a Boolean value.

It is also an object to provide a method comprising: receiving a representation of a two dimensional audiovisual presentation; selecting at least one sound in the two dimensional audiovisual presentation; associating the at least one sound with at least one visual object in the two dimensional audiovisual presentation; creating a three dimensional spatial model of the visual object consistent with an inferred spatial origin of the at least one sound; and outputting a representation in dependence on the three dimensional spatial model of the visual object.

The associating the at least one sound with at least one visual object in the two dimensional audiovisual presentation may comprises: calculating at least one characteristic delay of the at least one sound; auto-correlating at least a portion of the sound data with at least a portion of the visual data; ascertaining amplitude and equalization features to calculate a likely position of a source of the at least one sound; and associating the at least one sound with an object in the likely position of the source of the at least one sound; and providing an output representing said object in the likely position of the source of the at least one sound.

A further object provides a processor comprising: an input configured to receive a representation of a two dimensional audiovisual presentation; a computational unit configured to select at least one sound in the two dimensional audiovisual presentation; associate at least one visual object in the two dimensional audiovisual presentation as an inferred source of the at least one sound; and to create a three spatial dimensional model of the visual object consistent as the inferred source with the at least one sound; and an output configured to provide a representation of the three dimensional model of the visual object associated with the at least one sound.

The audiovisual presentation may comprise a vector quantized, extracted motion vector, compressed digital video file.

The computational unit may be further configured to calculate a characteristic delay of the at least one sound; auto-correlate at least a portion of the sound data with at least a portion of the visual data; ascertain amplitude and equalization features to calculate a likely position of a source of the at least one sound; and associate the at least one sound with an object in the likely position of the source of the at least one sound.

A still further object provides a non-transitory computer readable medium comprising computer instruction for: receiving a representation of a two dimensional audiovisual presentation; selecting at least one sound in the two dimensional audiovisual presentation; associating the at least one sound with at least one visual object in the two dimensional audiovisual presentation, wherein the object at least one of emits and modified the at least one sound; creating a three dimensional spatial model of the visual object associated with the at least one sound wherein the model is derived in part from, and is consistent with, the object at least one of emitting and modifying the sound; and providing an output selectively dependent on a representation of the three dimensional spatial model of the visual object associated with the at least one sound.

The audiovisual presentation may comprise a representation of a live sports event.

The instructions for associating the at least one sound with at least one visual object in the two dimensional audiovisual presentation may comprise instructions for: auto-correlating both the sound data with the visual data; ascertaining audio echo, amplitude and equalization features to calculate a likely position of a source of the at least one sound; and associating the at least one sound with an object as its inferred source in the likely position of the source of the at least one sound.

BRIEF DESCRIPTION OF THE DRAWINGS

FIG. 5 is a set of equations applied in the specification.

FIGS. 8A and 8B are sets of equations applied in the specification.

FIG. 9 illustrates a depth gradient assignment graph for a plane generated by two vanishing lines, in accordance with an embodiment of the invention.

FIG. 12 is a flow chart of an embodiment of the present invention involving creating three dimensional representations.

DETAILED DESCRIPTION OF THE PREFERRED EMBODIMENT

Figure 1:
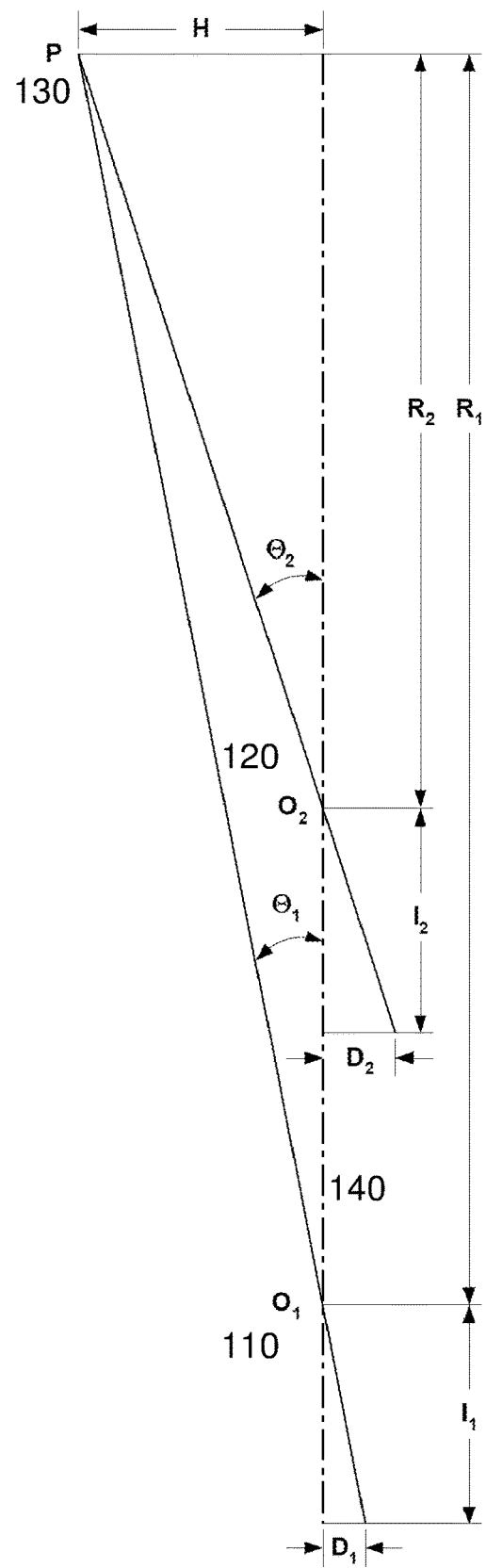
FIG. 1 provides a geometric model from extracting depth from a moving camera, according to one embodiment of the invention.

Several methods of 2D to 3D image and video conversion are known in the art. See, e.g., Sullivan, U.S. Pat. No. 7,573,475, expressly incorporated herein by reference. These methods generally require the selection of two images and converting one image into a "left eye view" and another image into a "right eye view." This technique is useful when there is a moving camera and the region to be viewed is relatively stationary. For example, a 3D model of a mesa in the Grand Canyon or Mount Washington in New Hampshire could be generated through this method.

However, in some situations only a single camera is available and there is movement in the scene to be imaged, for example, in a 2D recording of a college football game. Alternatively, there may be only a single 2D photograph of an image and a 3D model is desired. For example, a person involved in a car accident might have taken a single 2D photograph on his cell phone camera.

Depth Detection

Two dimensional imaging involves placing pixels on a screen and assigning each pixel a color. Three dimensional imaging is more complicated to the degree that the location (in three rather than two dimensions) and depth of each object must be known in order to properly model and render the objects in the viewing area.

Murphey describes a depth detection system that can be used for machine-aided driving. Murphey, "Depth Finder, A Real-time Depth Detection System for Aided Driving," IEEE, 2000. Murphey's system, with several modifications, could be used to provide depth detection 2D to 3D image conversion in television as well. This system could be run on a substantially arbitrary television coupled with a processor, video card or graphics processing unit (GPU). Alternatively, it could be run on a substantially arbitrary modern computer, such as a HP Pavilion DV3T laptop running a Microsoft Windows 7 operating system. Persons skilled in the art will recognize that other operating systems, for example Apple Macintosh OS X or Linux, could be used instead of Windows 7.

Many military and civil applications require the distance information from a moving vehicle to targets from video image sequences. For indirect driving, lack of perception of depth in view hinders steering and navigation. A real-time depth detection system, a system that finds the distances of objects through a monocular vision model, is disclosed herein. This depth detection system can be used with a camera mounted either at the front or side of a moving vehicle. A real-time matching algorithm is introduced to improve the matching performance by several orders of magnitude.

The application of computer vision and image processing can derive significant advantage in a number of military and civil applications including global picture generation and aided driving. Real-time depth detection is a significant component in these applications, in particular in vision-aided driving. Much research in depth detection has been conducted using stereo vision techniques. Stereo vision establishes correspondence between a pair of images acquired from two well-positioned cameras. In this paper, we present our research in depth finding from monocular image sequences. These can be used when two cameras or two different views of an image are not available.

Monocular vision is interesting to a number of military and civil applications. For example, monocular vision is necessary if a substantially arbitrary sequence of 2D images, such as a 2D video recording, is to be automatically converted to 3D. In other examples, indirect vision through the use of cameras can allow the crew of a military tank to operate the vehicle under full armor protection. In order to provide a full view of entire surroundings to a tank crew, we need to have a suite of cameras mounted at the front, rear, and sides of the tank with each camera providing the coverage for a specific area of the scene. Due to practical limitations on channel bandwidth and cost, depth finding using stereo cameras is an unlikely alternative. For indirect driving, lack of perception of depth in a monoscopic view hinders steering and navigation. Furthermore, depth finding from a monocular image sequence can be used as a fault tolerant solution when one camera in a stereo system is damaged.

This application describes, in part, a real-time depth detection system developed for in-vehicle surveillance. A video camera can be mounted at the front or the side of a vehicle or placed in a substantially arbitrary location. The major task of the depth finding system is to provide the current distance from a queried object to the vehicle. Computational speed is a critical issue in a scenario where both vehicle and the object can be moving.

Real Time Depth Finding

The computation of depth from a monocular image sequence obtained in the time domain is based on the geometric model shown in FIG. 1.

FIG. 1 illustrates the variables used in the formulas in FIG. 5 and discussed herein. A camera is moved from point $O_1$ 110 (at time $t_1$) to point $O_2$ 120 (at time $t_2$). The camera is being used to view an image at point P 130. The axis along which the camera is moved 140, is termed the optical axis. H is the distance between P 130 and the optical axis 140. $R_1$ is the projection of the distance between P 130 and the lens at moment $t_1$ on the optical axis. $R_2$ is the projection of the distance between P 130 and the lens at moment $t_2$ on the optical axis. $I_1$ is the distance between the lens and the image plane at moment $t_1$. $I_2$ is the distance between the lens and the image plane at moment $t_2$. $I_1$ and $I_2$ should be very close to one another. $D_1$ is the location of P on the image plane at moment $t_1$. $D_2$ is the location of P on the image plane at moment $t_2$. $\theta_1$ is the location of P on the image plane at moment $t_1$. $\theta_2$ is the location of P on the image plane at moment $t_2$.

From geometric optics, we have equation (1) in FIG. 5, where f is the focal length of the camera lens. Equation (2) in FIG. 5 can be derived from equation (1), where $L=R_1-R_2$ is the distance that the vehicle has moved during the time period that the two image frames are captured and $D_2-D_1$ is the disparity between the two images taken at time $t_1$ and $t_2$. Due to the compact size of the camera, we can assume that $R_2 \gg I_2$ (i.e. the distance between the object and the lens is much greater than the distance between the lens and the image plane inside the camera) and $H \gg D_2$ (i.e. the actual size of the object is much greater than its image on the image plane). Thus, equation (2) becomes equation (3) in FIG. 5.

Figure 2:
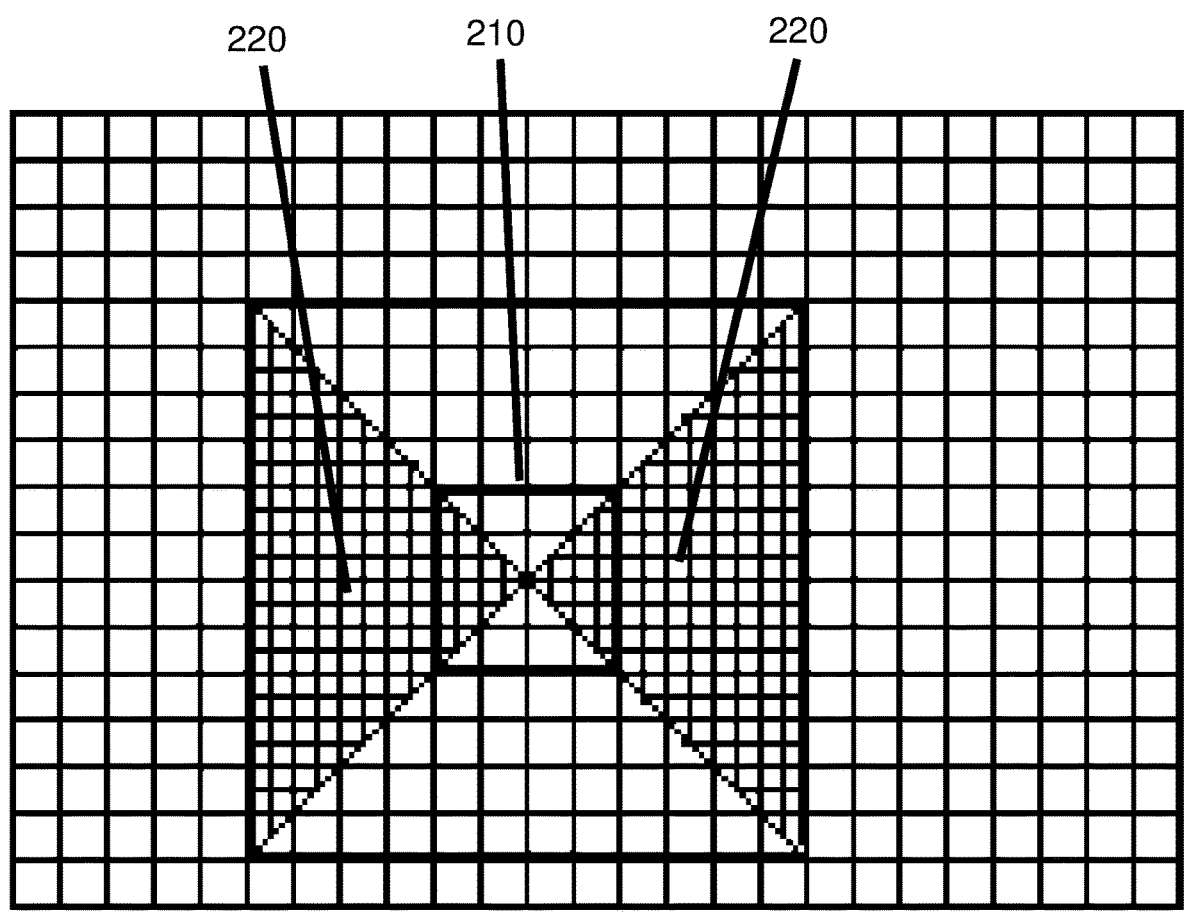
FIG. 2 illustrates a search window and a matching window, according to one embodiment of the invention.

According to equation in (3), the computation of the distance from an object to the vehicle involves two stages. First, search two sequential images to find matching objects. Finding matching objects gives us the disparity, $(\Delta x, \Delta y)$, or relative movement of the object from frame to frame. Second, we use the camera parameters and the disparity from step 1 to calculate the depth for each object of interest. The first step involves finding the correspondence of object match between the two image frames. There are a number of approaches being studied in the correspondence problem such as matching edges, object contour, or corners. These approaches depend very much on the outcome of the image feature extraction algorithms, which are also computationally demanding. In one embodiment, intensity feature is used to match corresponding pixels in the two adjacent image frames. In order to have accurate and efficient matching, a number of motion heuristics including maximum velocity change, small change in orientation, coherent motion and continuous motion are provided. Based on these heuristics, for a pair of images $I_t$ and $I_{t+1}$, we define a matching window and a search window to compute the correspondence problem (see FIG. 2). The match window 210, the smaller square in FIG. 2, is used to compute the similarity between the two portions in $I_t$ and $I_{t+1}$. The search window 220, the two shaded triangles, is used to limit the search for the possible location of a particular pixel in the image frame $I_{t+1}$.

The disparity between two images are computed as follows. For a pixel (x,y) in $I_t$, its corresponding location in $I_{t+1}$ is found by using the maximum likelihood function given in equation (4) of FIG. 5, where p and q should be within the matching window, and, $\Phi(u_i',v_j') \geq \Phi(u_i,v_j)$ for all $(u_i',v_j')$ within the search window. The use of the effective window reduces both the computation time and matching error. However, for an image of 540×480 and at the frame rate of 15 fps, the determination of disparity is perhaps still too computationally intensive. A brute force implementation of the algorithm requires the worst computation on the order O(L*H*Dx*Dy*p*q), where L and H are the image width and height, Dx and Dy are the maximum horizontal and vertical disparity values, and p and q are the matching region width and heights as defined above. For a 540×480 image with maximum disparity values Dx=Dy=4 and an average-sized matching window of 32×32, the number of comparisons (differences) that must be taken approaches 2 billion. In order to determine depth accurately while the vehicle is in motion, this computation time must be reduced by at least three orders of magnitude. To produce this computational speedup we use three techniques. First, we apply a dynamic programming algorithm to eliminate the matching window size (p,q) from the complexity. Second, we target the modern cache-dependent processor by localizing data access in the computation. Third, if the computation on a particular processor or image size is still not fast enough, we only calculate the depth of certain subregion(s) of the image.

The dynamic programming algorithm is based on the fact that many of the computations (i.e. intensity difference calculations) are repetitive. We use FIG. 3 to illustrate the algorithm.

Figure 3:
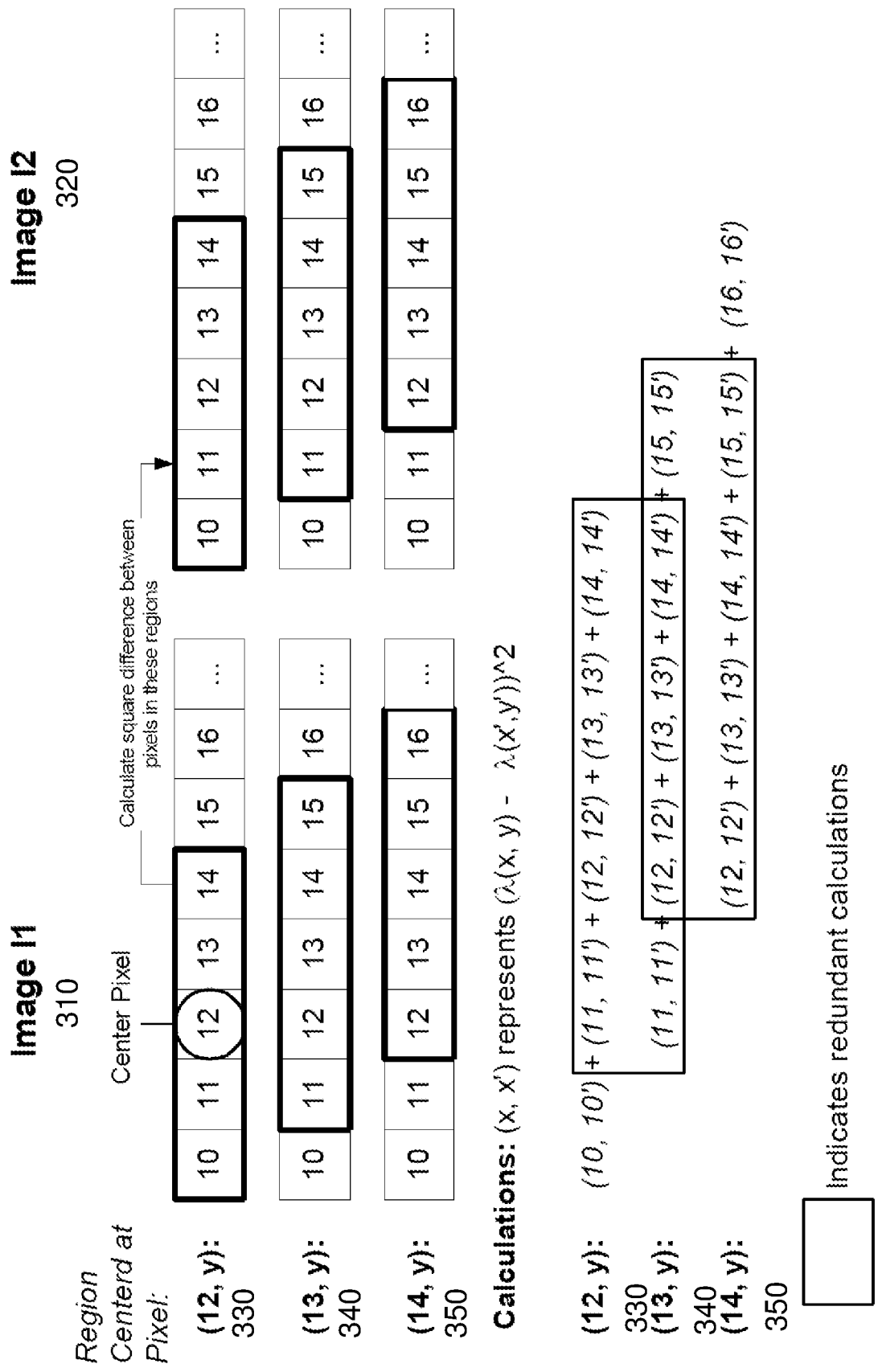
FIG. 3 illustrates an example of calculating $\Phi(u_i, v_i)$ for three regions.

FIG. 3 illustrates an example of calculating $\Phi(u_i,v_i)$ for three regions centered at pixel's (12, y) 330, (13, y) 340, and (14, y) 350, respectively. The region size is q=5, q=1, and $u_i=v_i=0$ is fixed. Note that each row of pixels in the figure is the same row (y) of the image; however, the region has shifted. The calculation is completed for both images $I_1$ 310 and $I_2$ 320.

For the convenience of description, we superimpose a linear window (i.e. q=1) on images $I_1$ and $I_2$. We denote each difference and square operation with a pair of x coordinates, (x,x') where x is the coordinate in image $I_1$ and x' is the corresponding coordinate in $I_2$. As the matching window shifts across $I_1$, we re-calculate the square difference for the same pixel exactly q−1 times (ignoring the boundary conditions). When the window becomes rectangular (i.e. p>0), we perform (p−1) repetitive calculations in the vertical direction. Therefore, we can implement the matching algorithm as follows. We first vary the center pixel before varying the disparity $(u_i,v_i)$. This allows us to store the results for each square difference calculation in a table and look them up as needed. This allows us to store the results for each square difference calculation in a table and look them up as needed. The data being stored are the sum and difference calculations for a single row of the image at a time (or possibly a q×L), and the minimum $\Phi(u_i,v_i)$ and the associated disparity, $(u_i,v_i)$, in a table for every pixel in the image. This implementation reduces the computational complexity by a factor of the window size, p×q, while the extra storage is proportional to the size of the image.

The implementation of the dynamic programming fully utilizes the localization of main memory address. It is well known in the art that localizing address requests to small regions of memory for long periods of time maximizes cache hits and can significantly increase performance. In an embodiment of the invention, address requests are localized in two ways. First, the invention involves making copies of the sub-region of the image needed in the calculation, and operate on those copies. Second, the invention involves exhaustively calculating all possible calculations (including saving intermediate results necessary for the dynamic method) on each row of the image before proceeding to the next row.

Combining the dynamic programming algorithm and cache-targeted optimizations, the invention reduces the computation time for an input image.

The final calculation speed is dependent on the application. If the video is being streamed in at 15-30 frames per second (fps) and depth calculations are required at least every 2-5 frames, the inventive system and method targets the depth calculations to cover small regions of interest. In one embodiment, the size of these regions is defined by the user and their selection is indicated by using a pointing device. Alternatively, a pre-selected region of interest, e.g. the center of the television screen, could be used. Because the depth calculation includes motion estimation of image object, we are able to track objects from frame to frame while displaying their depth. For applications that require infrequent updates of depth information (approximately once a second), as in the case of a slow moving robotic vehicle, the invention provides a system and method to calculate the depth across the entire image and display depths at user request for particular objects of interest. Murphey, "Depth Finder, A Real-time Depth Detection System for Aided Driving," IEEE, 2000.

Persons skilled in the art will recognize that there are other methods of depth perception with a single camera. For example, if the camera is not moving, interpolation techniques can be used. In order to find the parameters of the interpolation function, a set of lines with predefined distance from camera is used, and then the distance of each line from the bottom edge of the picture (as the origin line) is calculated. The results of implementation of this method show higher accuracy and less computation complexity with respect to the other methods. Moreover, two famous interpolation functions namely, Lagrange and Divided Difference are compared in terms of their computational complexity and accuracy in depth detection by using a single camera. M. Mirzabaki and A. Aghagolzadeh, "Introducing a New Method for Depth Detection by Camera Using LaGrange Interpolation," The Second Iranian Conference on Machine Vision, Image Processing & Applications, 2003.

Depth finding by using camera and image processing, have variant applications, including industry, robots and vehicles navigation and controlling. This issue has been examined from different viewpoints, and a number of researches have conducted some valuable studies in this field. All of the introduced methods can be categorized into six main classes.

The first class includes all methods that are based on using two cameras. These methods originate from the earliest research in this field that employ the characteristics of human eye functions. In these methods, two separate cameras are placed on a horizontal line with a specified distance from each other and are focused on a particular object. Then the angles between the cameras and the horizontal line are measured, and by using triangulation methods, the vertical distance of the object from the line connecting two cameras is calculated. The main difficulty of these methods is the need to have mechanical moving and the adjustment of the cameras in order to provide proper focusing on the object. Another drawback is the need for two cameras, which increases the cost and the system need to be replaced if one of the cameras fails.

The second class emphasizes using only one camera. In these methods, the base of the measurement is the amount of the image resizing in proportion to the camera movement. These methods need to know the main size of the object subjected to distance measurement and the camera's parameters such as the focal length of its lens.

The methods in the third class are used for measuring the distance of moving targets. In these methods, a camera is mounted on a fixed station. Then the moving object(s) is (are) indicated, based on the four scenarios: maximum velocity, small velocity changes, coherent motion, and continuous motion. Finally, the distance of the specified target is calculated. The major problem in these methods is the large amount of the necessary calculations.

The fourth class includes the methods which use a sequence of images captured with a single camera for depth perception based on the geometrical model of the object and the camera. In these methods, the results will be approximated. In addition, using these methods for the near field (for the objects near to the camera) is impossible.

The fifth class of algorithms prefer depth finding by using blurred edges in the image. In these cases, the basic framework is as follows: The observed image of an object is modeled as a result of convolving the focused image of the object with a point spread function. This point spread function depends both on the camera parameters and the distance of the object from the camera. The point spread function is considered to be rotationally symmetric (isotropic). The line spread function corresponding to this point spread function is computed from a blurred step edge. The measure of the spread of the line spread function is estimated from its second central moment. This spread is shown to be related linearly to the inverse of the distance. The constants of this linear relation are determined through a single camera calibration procedure. Having computed the spread, the distance of the object is determined from the linear relation.

In the last class, auxiliary devices are used for depth perception. One of such methods uses a laser pointer which three LEDs are placed on its optical axis, built in a pen-like device. When a user scans the laser beam over the surface of the object, the camera captures the image of the three spots (one for from the laser, and the others from LEDs), and then the triangulation is carried out using the camera's viewing direction and the optical axis of the laser.

The main problem of these methods is the need for the auxiliary devices, in addition to the camera, and consequently the increased complexity and cost.

Proposed Method

In one embodiment, two steps are provided. The first step is calculating an interpolation function based on the height and the horizontal angle of the camera. The second step involves using this function to calculate the distance of the object from the camera.

In the first step, named the primitive evaluation phase, the camera is located in a position with a specified height and a horizontal angle. Then, from this position, we take a picture from some lines with equal distance from each other. Then, we provide a table in which the first column is the number of pixels counted from each line to the bottom edge of the captured picture (as the origin line), and the second column is the actual distance of that line from the camera position.

Now, by assigning an interpolation method (e.g. Lagrange method) to this table, the related interpolation polynomial, equation (5) in FIG. 5, is calculated In this formula, x is the distance of the object from the camera, and n is the number of considered lines in the evaluation environment in the first step.

In the second step of this method—with the same height and horizontal angle of the camera—the number of the pixels between the bottom edge of the target in the image (the nearest edge of an object in the image to the base of the camera) and the bottom edge of the captured image is counted and considered as x values in the interpolation function.

The output of this function will be the real distance between the target in the image and the camera.

This method has several advantages in comparison to the previous methods, such as the one discussed above.

a) Only one stationary camera is involved.

b) There is no direct dependency on the camera parameters, such as focal length, etc.

c) There is a small number of uncomplicated calculations, allowing for fast processing speed.

d) No auxiliary devices are required. Thus, the method can be applied to substantially arbitrary images taken by substantially arbitrary cameras.

e) Having a constant response time, as the method comprises a fixed amount of calculations. Therefore, the method is useful in applications like 2D to 3D television program conversion, where response time is important. (For example, many sports viewers prefer to view sportscasts in "real time" as the game is being played, rather than with some delay. Also, many viewers like to watch movies recorded on DVD or similar media immediately after they insert the disk into the player.)

f) The method exhibits low fault in calculating distances in the evaluation domain.

g) This method can be used for both stationary and moving targets. Therefore, a moving camera is not necessary, as in the example above.

Why is the LaGrange Method Used?

There are two well known interpolation methods: The LaGrange and the Divided difference method of Newton. But for the purpose of the method proposed above, the LaGrange method is preferred for the following reasons.

1) In the method of the divided difference of Newton, by adding new points before the first point or after the last point of the table, a few extra operations are needed to correct and adjust the previous interpolation polynomial with the new situation. In the LaGrange method, on the other hand, all of the operations must be recommenced. For the purposes of the method, this feature is not important as the number of points determined in the evaluation phase and after that time will be constant.

2) Although the error of both methods is approximately equal, the number of the division operations in the latter method is more than the former. In the Lagrange method, for n points there are n division operations, but in the Newton method, there are $n(n-1)/2$ such operations. As demonstrated here, for more than three points the number of the divisions in Newton case is more than that of the other one. Division causes floating point error as in digital computers, so the error in the Newton method will be greater than the error in the Lagrange method.

3) In Newton's divided difference method, each phase needs the result of the previous phase to complete its calculation. Therefore, although the number of operations in the Lagrange interpolation may be, because of parallel processing, more than the Newton one, the total computation time will be less than the second one's.

Reviewing the above reasons, it can be concluded that the LaGrange interpolation method is preferred over the Newton method. However, the invention is not limited to LaGrange interpolation, and either of these methods, as well as other methods of interpolation, may be applied. M. Mirzabaki and A. Aghagolzadeh, "Introducing a New Method for Depth Detection by Camera Using LaGrange Interpolation," The Second Iranian Conference on Machine Vision, Image Processing & Applications, 2003.

The methods of Mirzabaki and Murphey, substantially described above, can be used to detect the depth in substantially arbitrary images taken by single cameras. Murphey works best when the camera is moving and the surrounding scene is substantially immobile, for example a camera moving around a room in a video for a real estate advertisement. Mirzabaki is best applied when there is at least one object in the scene whose height can be approximated and there is at least one length that can be approximated. This is true of most television images. For example, most adult men are within 10% of two meters in height. Most television clips feature at least one scene where an adult man is involved. Therefore, an object having a fixed height can be obtained fairly easily. In addition, many video clips feature objects of known length, width, and height. For example, a small sedan, such as the Toyota Corolla S 2010, has a height of 57.7 inches, a width of 69.3 inches, and a length of 178.7 inches. Toyota Corolla Performance & Specs, www.toyota.com/corolla/specs.html, last accessed May 20, 2010. The dimensions of other common objects and scenes can also easily be determined and stored in the memory of a substantially arbitrary computer processor, such as a HP Pavilion DV3 laptop running a Microsoft Windows 7 operating system. Of course, other machines and operating systems can also store this information. Persons skilled in the art will recognize that There are many known automatic facial and object recognition techniques. For example, Commons, U.S. Pat. No. 7,613,663, incorporated herein by reference, presents a method of facial and object recognition using hierarchal stacked neural networks. Other methods of facial recognition are discussed in Steffens, U.S. Pat. No. 6,301,370, incorporated herein by reference. Object recognition systems and methods are disclosed in detail by McQueen, U.S. Pat. No. 6,069,696, incorporated herein by reference. The methods presented herein, when coupled with the facial and object recognition techniques of Commons, Steffens, McQueen, and others, can be used to provide a representation of the depth of the objects in a substantially arbitrary set of consecutive 2D images or single 2D image.

The next step is to provide a representation of all of the objects in the image and their depths and provide this information to a module that would produce a left eye view and a right eye view of the image. These left eye and right eye views are preferably distinct and may be viewed either directly on the television screen or through special 3D glasses designed for 3D viewing on the screen.

In another embodiment, depth detection may be accomplished by providing a 3D model of a portion of the objects in a scene. For example, in a video of a college football game played in the United States during a given season, such as fall 2009, 3D models could be developed of all of the college football players in the country, all of the stadiums, and of the ball used in the game. Such a 3D model can be stored in a 10 GB or smaller processor RAM, allowing the method described herein to be implemented on a substantially arbitrary modern computer, such as a HP Pavilion DV3 running a Microsoft Windows 7 operating system. Alternatively, an Apple or Linux operating system can be used instead of Windows. In one embodiment, the data is stored on a video card or GPU internal to the television. In another embodiment, the data is stored on a video game system external to the monitor, such as a Microsoft Xbox 360, Nintendo Wii or a Sony PlayStation.

It is noted that, while college football is used as an example here, other data sets can also be modeled with the system and method described herein. For example, World Cup American soccer games can also be modeled by generating a 3D model of the soccer stadium in which the game is played, all of the members of the opposing teams, and of the soccer ball. Alternatively, a 3D representation of a figure skating show could be provided by generating a 3D model of all of the skaters and of the ice rink.

In another embodiment of the invention, a 3D representation of a television soap opera, such as "Desperate Housewives," could be generated from the original 2D recording. The 3D model would store a representation of all or most of the actors in the recording. In addition, a 3D model of common scenes in the soap opera would be stored. For example, in "Desperate Housewives," it would be desirable to have a 3D model of the buildings on *Wisteria* Lane, the interior of the homes of main characters, and of items typically found inside houses, such as a bed, a sofa, a table, a chair, etc. As in the sports examples above, such a 3D model can be stored in a 10 GB or smaller processor allowing for the system and method described here to be implemented in a substantially arbitrary modern computer, such as a HP Pavilion DV3 running a Microsoft Windows 7 operating system, or an Apple or Linux computer. Alternatively, the invention could be implemented in a monitor with a GPU internal to the monitor or a monitor connected to an external GPU in a video game machine, such as a Sony PlayStation or similar device.

It is noted that, while "Desperate Housewives" is provided as an example here, other television serials, such as "Monk," "Modern Family" or "Middle," could be modeled through a similar mechanism to the one described for "Desperate Housewives," as all of these shows feature repeating actors and repeating scenes.

It is further noted that, while in all of the above examples the 3D models were stored locally to the monitor, this is not necessary. In one embodiment, the 3D models are stored on the Internet or on a remote database and the processor, monitor, or video game system implementing the invention is provided with a method of accessing the Internet or the remote database. In another embodiment, the video is stored on the Internet, and audio and images from the video are processed through the Internet to generate a 3D model thereof to display to a viewer.

For example, home videos are typically recorded by individuals and shared with friends and family over YouTube.com or a similar video-sharing website. These videos may be recorded with 2D video cameras and uploaded in 2D format. Many home videos feature similar scenes and subjects, for example, babies, young children, water, tropical vacations, and life events (e.g. weddings, baby showers, Bar Mitzvahs, etc.) are common video subjects. See, generally, This American Life #225: Home Movies, originally aired Nov. 9, 2002 by Public Radio International, available at www.thisamericanlife.org/radio-archives/episode/225/home-movies?bypass=true, last accessed Jun. 15, 2010. A database storing 3D models of the common subjects of home videos could be stored on the Internet or provided for upload to interested parties. Such a database would store, among other data, a 3D model of a baby, a 3D model of a swimming pool, a 3D model of a palm tree, etc. The home videos could then be converted from 2D to 3D either when the video files are transferred from the camera to the laptop or desktop computer, when the video files are uploaded to the Internet, or when the video files are downloaded to the viewer's computer or 3D screen. In another embodiment, the 2D-to-3D conversion could be completed in the video camera. This is especially useful if the video camera is connected to a processor, for example a video camera in a smart phone such as the iPhone 3GS or iPhone 4G.

Three Dimensional Image Generation

Various systems and methods for generating a 3D image of a scene of which a 3D model exists are known in the art. For example, Tetterington, US App. 2006/0061651, incorporated herein by reference, discusses one 3D image generator configured for use in a video game system. Tetterington requires that the video game system have a model of a 3D "world" in which the game is played. A separate left image for the left eye and a separate right image for the right eye are generated by shifting the player look at position slightly to the left and slightly to the right from the monocular 2D position, resulting in a 3D view of the scene. Liquid crystal glasses worn by the user of the video game system, alternating between clear and dark synchronized with the vertical refresh rate of the television screen or monitor while generating synchronized left and right images, thereby allow each of the viewers eyes to independently view a separate image.

Battiato also discusses the generation of 3D stereoscopic image pairs from depth maps. Battiato, "3D Stereoscopic Image Pairs by Depth-Map Generation," Association for Computing Machinery, 2004.

Battiato presents a new unsupervised technique aimed to generate stereoscopic views estimating depth information from a single image input. Using a single image input, vanishing lines and points are extracted using a few heuristics to generate an approximated depth map. The depth map is then used to generate stereo pairs. However, persons skilled in the art will note that other 3D representations and models may be used instead of stereo pairs. The overall method is well suited for real time application and works on color filtering array (CFA) data acquired by consumer imaging devices or on professionally-made photographs or videos.

Traditionally, to generate a 3D view from a single 2D view or image different tools have been required. These methods are not fully automatic application and require expensive computational resources beyond the means of a typical household having a television. The present invention proposes, in one embodiment, a single framework aimed to obtain the stereoscopic view avoiding the user interaction and reducing the computation complexity. Moreover, the depth map generation step is able to work directly onto a Bayer pattern image (CFA) further reducing band, memory and complexity requirements. Alternatively, a sub-sampled image can be used.

This proposed technique is based on a novel algorithm able to generate a depth map from a single image. The strength of the inventive method detailed below is then used to reconstruct the left and right view. The two steps are pipelined to obtain a single automatic 3D generation procedure. In order to obtain the depth map, an image preprocessing is required. It is composed of image classification, followed by vanishing lines and vanishing point extraction.

The stereoscopic pair image is then generated by calculating the parallax value of each object in the image extracting information only from the grey level depth map. The final left and right eye images give to the user a 3D perspective entertainment. The highlighted process is fully automatic and well suited for real-time application. The effectiveness of the proposed processing pipeline has been validated by an exhaustive set of experiments.

Image Pre-Processing

To generate the stereoscopic pair image (left and right view) the depth information of the objects inside the scene has to be estimated. In order to obtain the depth information, a preliminary image pre-processing is applied to extract the relevant information from the input image. The image is first classified as: Outdoor/Landscape, Outdoor with Geometric Elements or Indoor. According to each specific class, the relevant vanishing lines and the related vanishing point are then selected.

Image Classification

The main steps of the classification are summarized as follows:

Semantic region detection involves locating regions of the image, such as: Sky, Farthest Mountain, Far Mountain, Near Mountain, Land and Other. A preliminary color-based segmentation, which identifies chromatically homogeneous regions, helps to reduce incorrect region detection. To each detected region a fixed grey level is assigned.

Comparison of N sampled columns of the semantic regions detection output with a set of typical strings containing allowed region sequences.

Final classification is the step where the output of the previous step is used to classify the image according to heuristics.

Vanishing Lines Detection

The image classification result can also be used to properly detect some image features, like vanishing lines and related Vanishing Point (VP).

Figures 6, 7:
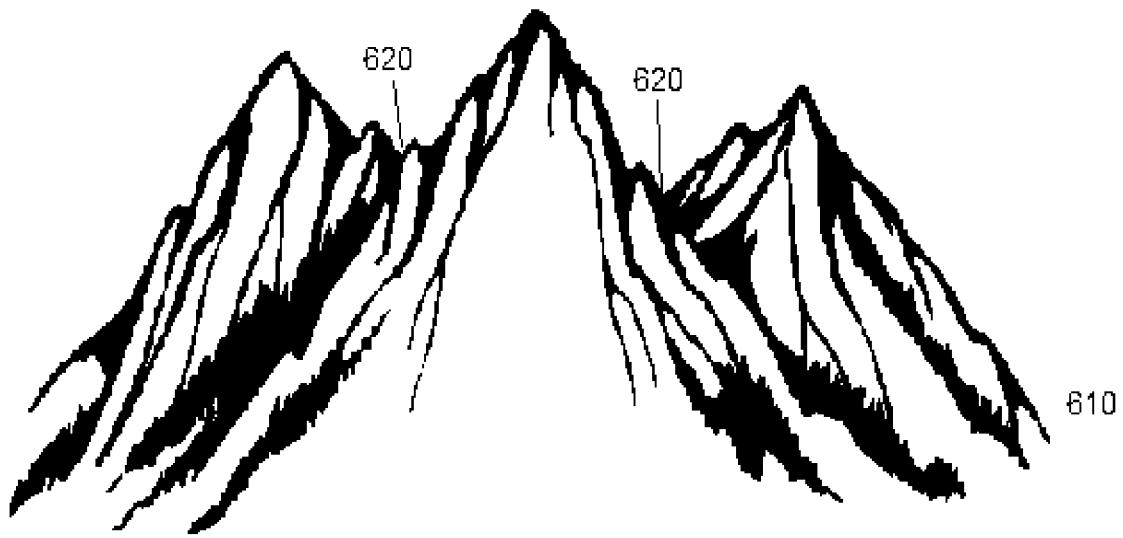
FIG. 6 illustrates an image that can be analyzed in accordance with an embodiment of the present invention.
FIG. 7 is a set of equations applied in the specification.

If the input image is classified as outdoor without geometric elements, as in FIG. 6, the lowest point in the boundary between the region A=Land U Other and the other regions is located. Using such a boundary point (xb,yb) 610 the coordinates of the VP are fixed to where W is the image's width. Moreover, the method generates a set of standard vanishing lines 620.

When the image is classified as outdoor with geometric appearance or indoor, the VP detection is conducted as follows. FIG. 7 illustrates some equations that are useful for the calculations discussed here.

1. Edge detection using a 3×3 Sobel mask. The resulting images, $I_{Sx}$ and $I_{Sy}$, are then normalized and converted into a binary image $I_E$, eliminating redundant information.

2. Noise reduction of $I_{Sx}$ and $I_{Sy}$ using a standard lowpass filter 5×5.

3. Detection of the main straight lines, using $I_{Sx}$ and $I_{Sy}$, passing through each edge point of IE, where in is the slope and is the intersection with the y-axis of the straight line defined by equation (1) and equation (2) of FIG. 7.

4. Each pair of parameters (m,q) is properly sampled and stored in an accumulation matrix, according to equation (3) of FIG. 7, where higher values correspond to the main straight lines of the original image.

5. The intersection between each pair of main straight lines is computed.

6. The VP is chosen as the intersection point with the greatest number of intersections around it, while the vanishing lines detected are the main straight lines passing close to VP.

Depth Map Generation

Taking into account the information collected in the pre-process analysis a series of intermediate steps are used to recover the final depth map. These steps can be summarized as: (1) gradient planes generation; (2) depth gradient assignment; (3) consistency verification of detected region; (4) final depth map generation.

FIGS. 8A and 8B illustrate show equations that are useful in this process.

Gradient Planes Generation

During this processing step, the position of the vanishing point in the image is analyzed. Five different cases can be distinguished, as illustrated in Table 1 of FIG. 8A, where $X_{vp}$ and $Y_{vp}$ are the vanishing point coordinates onto the image plane and H and W the image height and width.

For each case a set of heuristics (Table 1 of FIG. 8A), based on vanishing lines slope and origin of the vanishing lines onto image plane allow generating horizontal and/or vertical planes (gradient planes) used to gradually set the depth variation.

Preferably, at least two vanishing lines 620 are detected prior to the operation of the method.

Depth Gradient Assignment

A grey level (corresponding to a depth level) is assigned to every pixel belonging to depth gradient planes.

Two main assumptions are used: (1) Higher depth level corresponds to lower grey values; and (2) the vanishing point is the most distant point from the observer.

In most cases, in horizontal planes the depth level is constant along the rows, while in vertical planes it is constant along the columns. The depth level is approximated by a piece-wise linear function, illustrated in Table 2 of FIG. 8B, depending on slopes $m_1$ and $m_2$ of vanishing lines generating the depth gradient plane.

FIG. 9 illustrates a graph 910 comprising two vanishing lines 912 from an image (not illustrated). These are converted to a depth gradient assignment graph 920.

This choice is justified by the consideration that human vision is more sensible to deep variations of close objects than for far ones. Thus the deep levels have a slope that increases going from the closest position to the farthest one (VP).

The output image obtained by regions detection step (qualitative depth map) is analyzed to verify the consistency of the detected regions. In fact, the regions have been detected only by color information. It is preferable, therefore, to analyze the positions, inside the image, of each region with respect to the others checking their dimensions. Using a set of heuristics, the columns of the image are properly scanned to produce some sequences of "regions" which are checked and, if necessary, modified for "consistency verification." In this way false regions are eliminated from the image.

For example, if between two regions of the image classified as "Sky" there is a different region (e.g. mountain or land) with a vertical size more than a fixed threshold, the second "Sky" region is recognized as a false "Sky" region and is changed to the same type of the upper one.

Similar rules are used to detect the consistency for the others image regions.

Depth Map Generation by Fusion

In this step, the qualitative depth map and the geometric depth map are "fused" together to generate the final depth map M. Let $M_1(x,y)$ be the geometric depth map and $M_2(x,y)$ the qualitative depth map after the consistency verification analysis of the regions. The "fusion" between $M_1(x,y)$ and $M_2(x,y)$ depends on the image category.

1. If the image belongs to the indoor category, then $M(x,y)$ coincides with $M_1(x,y)$. $M(x,y)=M_1(x,y)$ for all $(x,y)$ $0 \leq x \leq W-1$ and $0 \leq y \leq H-1$.

2. If the image is classified as outdoor with absence of meaningful geometric components (landscape, e.g. FIG. 6) then the image $M(x,y)$ is obtained as follows:

$M(x,y)=M_1(x,y)$ for all $(x,y)$ in land or $(x,y)$ in other.

$M(x,y)=M_2(x,y)$ for all $(x,y)$ in not land and $(x,y)$ in not other.

3. If the image is classified as outdoor with geometric characteristics, then the image $M(x,y)$ is obtained as follows:

$M(x,y)=M_2(x,y)$ for all $(x,y)$ in sky.

$M(x,y)=M_2(x,y)$ for all $(x,y)$ in not sky.

Stereoscopic Pair Image Generation

Above, a method to reconstruct the binocular view of an image from a monocular view of the image has been proposed. The stereoscopic image pair is obtained by extracting the parallax values from the generated depth map and applying them to the single view input image. The parallax views can be thought as functions of the inter-ocular distance, or baseline B, considering that:

an introduced big difference between consecutive depth layers, thus between foreground and background, affects the images with unresolved occlusions; and the human eyes are commonly used to converge to a point focusing on it, while with a parallax close to B they have to stay parallel;

the max parallax should be less than B and, consequentially, the depth effect into the screen will be less visible. So fixing a max depth into the screen we can derive the max allowed parallax.

Figure 10:
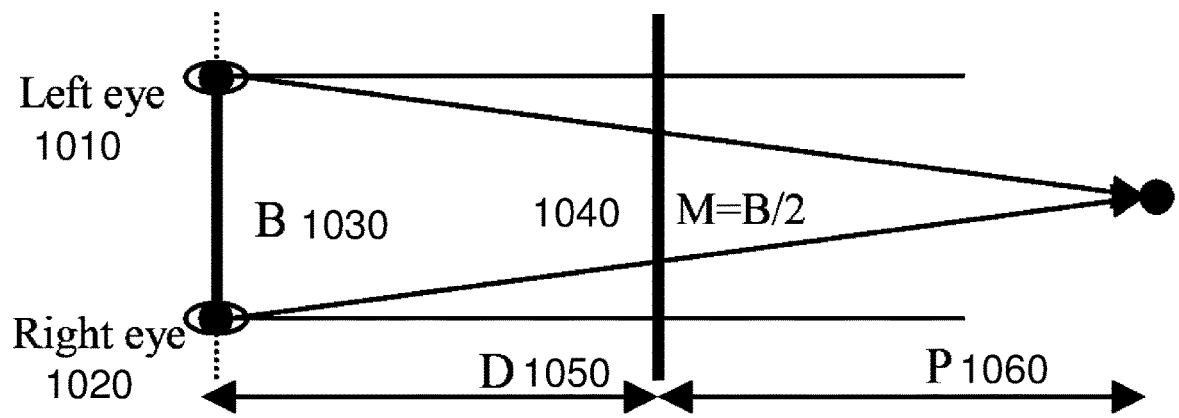
FIG. 10 illustrates parallax relations with respect to a screen in accordance with an embodiment of the invention.

Moreover, the viewer distance from the screen plays a fundamental role. The human vision system has 46 degrees as diagonal aperture; therefore, the minimum distance allowing a comfortable vision of the screen can be evaluated. FIG. 10 illustrates parallax relations with respect to a screen. If the distance D 1050, between the viewer's left eye 1010, right eye 1020 and the screen, is equal to the max depth effect into the screen P 1060, the achievable parallax is equal to B/2, thus more comfortable than B 1030.

Considering the FIG. 10, and exploiting the correlation between similar triangles, we have equation (4) of FIG. 7, where M 1040 is the max parallax, B 1030 is the inter-ocular distance, P 1060 is the depth of the screen, and D 1050 is the user-to screen distance. Starting from equation (4) of FIG. 7, equations (5) and (6) of FIG. 7 can be derived, where the depth_value is the depth map pixel value and N is a reduction factor. Tuning different values of N, the max parallax value changes and optimized 3D images are obtained.

In order to reconstruct the left and right views, equation (7) of FIG. 7 is used.

Figure 11:
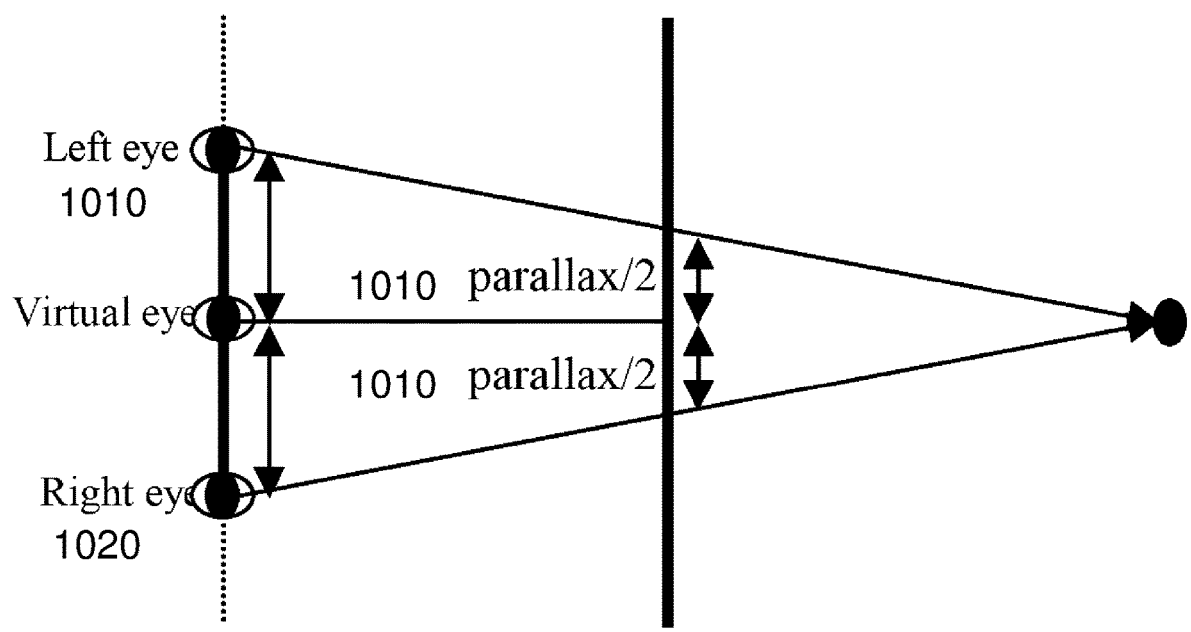
FIG. 11 illustrates stereoscopic image pair generation in accordance with an embodiment of the invention.

For each pixels of the input image the value of the parallax is obtained from its depth_value. Considering the input image as a virtual central view, the left and the right views are then obtained, as shown in FIG. 11, shifting the input image pixels by a value equal to parallax/2 1110 for each view. Battiato, "3D Stereoscopic Image Pairs by Depth-Map Generation," Association for Computing Machinery, 2004.

In some cases, when the 3D model of a 2D image is created, surfaces and objects which were previously blocked may become visible. In this situation, one embodiment of the invention leaves those areas in a solid color, e.g. gray. However, this is not preferred as it does not optimize the view for the user. A preferred embodiment would try to make a "best guess" as to the shapes and features of the uncovered surface. For example, if a 2D image is in a room where the floor is covered with a tapestry having a fixed pattern and a shift to 3D causes a part of the floor, which was previously obscured by a dining table, to be uncovered. The preferred embodiment would copy the pattern of the tapestry onto the uncovered surface. Persons skilled in the art will recognize many automatic pattern recognition techniques that could accomplish this result. For example, Matsagu teaches a pattern recognition system in U.S. Pat. No. 7,697,765, incorporated herein by reference. A preferred embodiment of the invention would train a hierarchal stacked neural network, such as that taught by Commons in U.S. Pat. No. 7,613,663, incorporated herein by reference, to predict the uncovered patterns. This way, even unusual patterns, such as wall clocks, paintings, oddly-shaped furniture, etc., which was partially covered in the 2D view could be fully developed in the 3D view.

The method presented here could be used for single frame 2D to 3D conversion at a high rate of speed. When this method is implemented on a modern computer, for example an Intel Core i7 965 processor with one or more nVidia Tesla M2050 graphic processing units, the process should be able to run in an amount of time on the order of a few seconds or less, making the process useful for watching substantially arbitrary Cable, broadcast, or DVD programs.

Motion Vector Image Change Analysis

FIG. 12 illustrates a flow chart for another embodiment of the present invention.

In step 1210, the processor receives as input a representation of an ordered set of two dimensional images, such as a video. Any arbitrary sequence of two dimensional images may be provided as input. For example, in one embodiment, a scene from Steven Spielberg's film *Jurassic Park* (1993), which was shot in two dimensions by a single camera, may be used. Note that the camera may be stationary or mobile. Either a single camera or multiple cameras may be used. In another embodiment, a set of two dimensional photographs taken by a security camera are used. The processor may be a processor from an arbitrary computer, such as a HP Pavilion dv3 running Windows 7. Alternately, a computer running the operating system Apple Macintosh Os X or Linux may be used. In another embodiment, the processor is in a video card, which might be located internal to a TV screen or monitor or in a video game system connected to the TV such as the Microsoft Xbox 360, Nintendo Wii or the Sony PlayStation. The connection may be through wires, or over a wireless means such as WiFi, Bluetooth, infrared or microwave.

In step 1220, the processor analyzes the ordered set of two dimensional images to determine a first view of an object in two dimensions 1222 and a motion vector 1224. The first view of an object 1222 can be any scene depicting an object. For example, an image might show a woman standing in front of a Toyota Corolla S 2010, where the woman obscures a portion of the view of the car. In the discussion below, the object will be the Toyota Corolla S 2010, although in another embodiment of the invention, the object might be the woman or any other object in the scene. The motion vector 1224 can be any motion of an object, the camera, or air, light, etc. in the scene. For example, if the woman is moving to the left, this might constitute the motion vector. Alternatively, the car might be moving, or the wind could be blowing the woman's hair or blouse. In another embodiment, the motion vector represents the motion of the camera.

In step 1230, the processor analyzes the combination of the first view of the object in two dimensions and one dimension of time, the motion vector, and the ordered set of two dimensional images to determine a second view of the object 1232. For example, if the motion vector represents the woman moving to the left, a second view of the car is provided. In another embodiment, if the motion vector represents the camera moving to another angle of the camera and the car, a second view of the car, with the woman obscuring a different part of the car, is provided again.

In step 1240, the processor generates a three dimensional representation of the ordered set of two dimensional images based on at least the first view of the object and the second view of the object. The two views of the Toyota Corolla S 2010 reveal more of the features of the vehicle, allowing a three dimensional model to be built. In one embodiment, the three dimensional model is a stereoscopic view, and two views of the scene, a left eye view and a right eye view, are provided. In another embodiment, a full three dimensional model may be provided, and the viewer would be able to see different parts of the Toyota as he moves his head or his body around the television set or monitor. There may be different views as the viewer moves to the left and to the right, as well as up and down.

Step 1250 illustrates that in one embodiment of the invention, for example, where a part of a shape is always invisible in the two dimensional view (e.g. if the woman is always obscuring a side mirror of the Toyota), the processor could predict a shape and color of at least one object that is not visible in the two dimensional image but is visible in the three dimensional model on the basis of an Internet lookup, a database lookup or a table lookup. The database or table may be local or remote to the processor. In the example with the woman and the Toyota above, the Internet (e.g., Google images), database or table contains a representation of a Toyota Corolla S 2010. From the visible part of the image, the processor recognizes that one of the objects in the image is a Toyota Corolla S 2010 and uses the three dimensional model on the Internet, database or table to extract the features of this vehicle (e.g. side mirror) that need to be presented on the screen, as well as the location, color, and shape of these objects. The color and shape may be dependent on the other colors and shapes in the scene. For example, if the Toyota is white, then the covers of the mirrors thereof also need to be white. The scene in the mirror should include a reflection of the objects to which the mirror is pointing.

In step 1260, the processor provides as an output, an indicia of the three dimensional representation. These indicia may be a display on a screen or a representation from which a screen display can be created.

Three Dimensional Screen Based on Viewer Position

In another embodiment, the present invention provides a three dimensional television based on viewer position.

There are several ways to determine the position of a viewer of a television. If the viewer of the television is wearing 3D glasses or other clothing or accessories that communicate with the television, the 3D glasses can communicate the distance and angle of the viewer to the television. The distance and angle can be determined through a triangulation technique. Alternatively, the television could have a camera attached thereto. The camera could be connected to a facial recognition module, which would ascertain the position of the user's face in the scene. The distance and angle of the user's face to the television could then be calculated using techniques similar to those described above in the 2D to 3D conversion method. Alternatively, because the focal length of the camera connected to the television may be known, the camera's focal length can be used as the basis of calculating the distance and angle of the user to the television. Persons skilled in the art will note that this system and method is useful not only for native 2D films that are converted to 3D, e.g. *Jurassic Park*, but also for native 3D films, e.g. Avatar. This system and method is an improvement over traditional 3D viewing techniques, at least in part, because user fatigue can be reduced to the degree that the user no longer has to have inconsistent information provided to her eyes if she is sitting at a distance and angle from the television for which the 3D show was not designed.

Persons skilled in the art would further note that this technique could further be used to implement a 3D touch screen. Basic touch screen programs with two dimensional screens are known in the art. For example, the Apple iPhone 3G has a touch screen user interface, as do a significant number of computerized ATM machines in the United States. A two dimensional television can implement a similar touch screen device. One embodiment of a two dimensional touch screen machine is disclosed by Heidal, U.S. Pat. No. 5,342,047, incorporated herein by reference.

However, the touch screen is a problem for three dimensional televisions. In three dimensional screens, unlike two dimensional screens, each point on the screen does not map to an image. Rather, the image is based on three factors: (1) the location of the viewer's left eye, (2) the location of the viewer's right eye, and (3) the position on the screen. Thus, the three dimensional television must locate the left eye and right eye of the viewer in order to ascertain which object the viewer is attempting to manipulate with the touch screen. The left and right eyes of the viewer can be located a using a camera communicatively connected to the screen. The distance to the eyes can then be calculated using the focal length, thereby rendering a representation of the position of the person's eyes.

Figure 15:
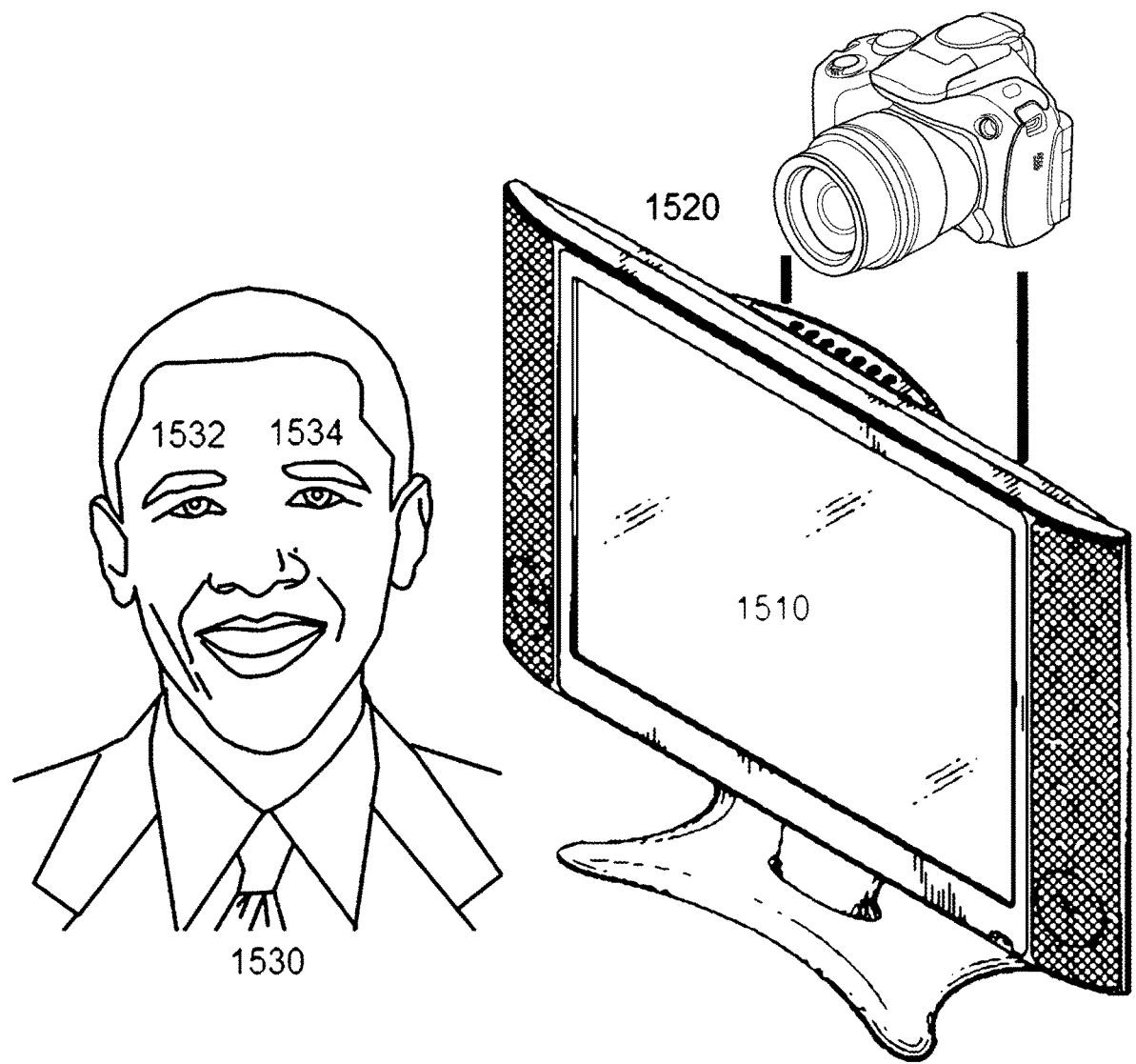
FIG. 15 illustrates a mechanism by which a 3D touch screen device ascertains the position of a user, in accordance with one embodiment of the invention.

FIG. 15 illustrates the three dimensional screen idea in detail. A camera 1520 is placed on top of a three dimensional screen 1510. The camera 1520 can ascertain the position of the eyes 1532 and 1534 of the user 1530. If this embodiment is to be used as a touch screen, the screen knows where the user touches it through the conventional touch screen technology. See, e.g., Heidal, U.S. Pat. No. 5,342,047, incorporated herein by reference, describing a touch screen machine.

Figure 13:
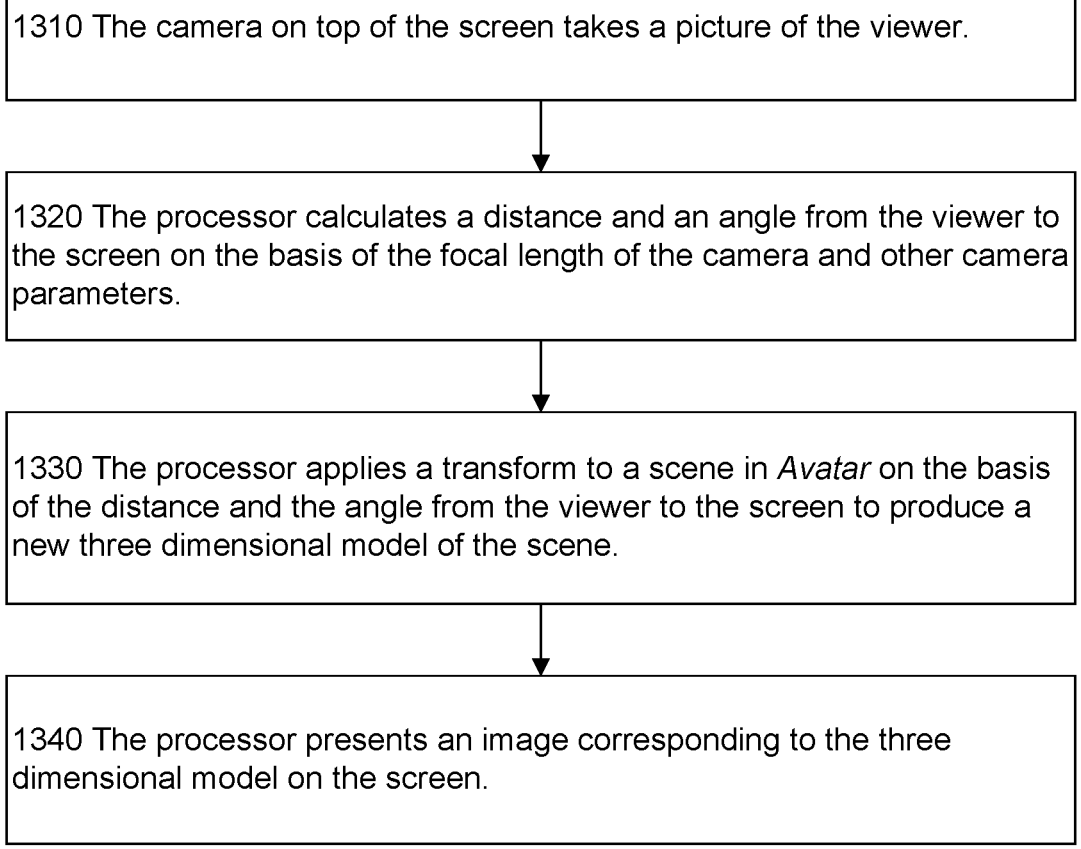
FIG. 13 is a flow chart of an embodiment of the present invention involving a method of presenting three dimensional images.

FIG. 13 is a flow chart depicting how a system, such as the one illustrated in FIG. 15, operates according to one embodiment of the invention.

In step 1310, the camera on the top of the screen takes a picture of the viewer.

In step 1320, the processor calculates a distance and an angle from the viewer to the screen on the basis of the focal length of the camera and other camera parameters. In another embodiment, image parameters not related to the camera could be used instead of camera parameters. This is explained in detail in the discussion of 2D to 3D conversion herein. In yet another embodiment, the viewer could be wearing 3D glasses or some other clothing or accessory that could signal the viewer's position to the processor. Under the latter embodiment, a camera taking a picture, as in step 1310, is not necessary.

In step 1330, the processor applies a transform to a scene in the 3D film Avatar on the basis of the distance and angle from the viewer to the screen in order to produce a new three dimensional model of the scene. Persons skilled in the art will note that a 3D-to-3D transform is involved here. In another embodiment, the base film could be a 2D film, such as Spielberg's *Jurassic Park*. In this case, a 2D-to-3D transform would be involved. In yet another embodiment, a 2D or 3D photograph, rather than a film, could be transformed and displayed on the screen in three dimensions.

In step 1340, the processor presents an image corresponding to the three dimensional model on the screen.

Figure 14:
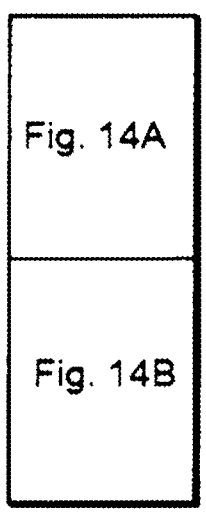
FIGS. 14A and 14B illustrate the operation of a touch screen machine, in accordance with one embodiment of the invention.
Figure 14A:
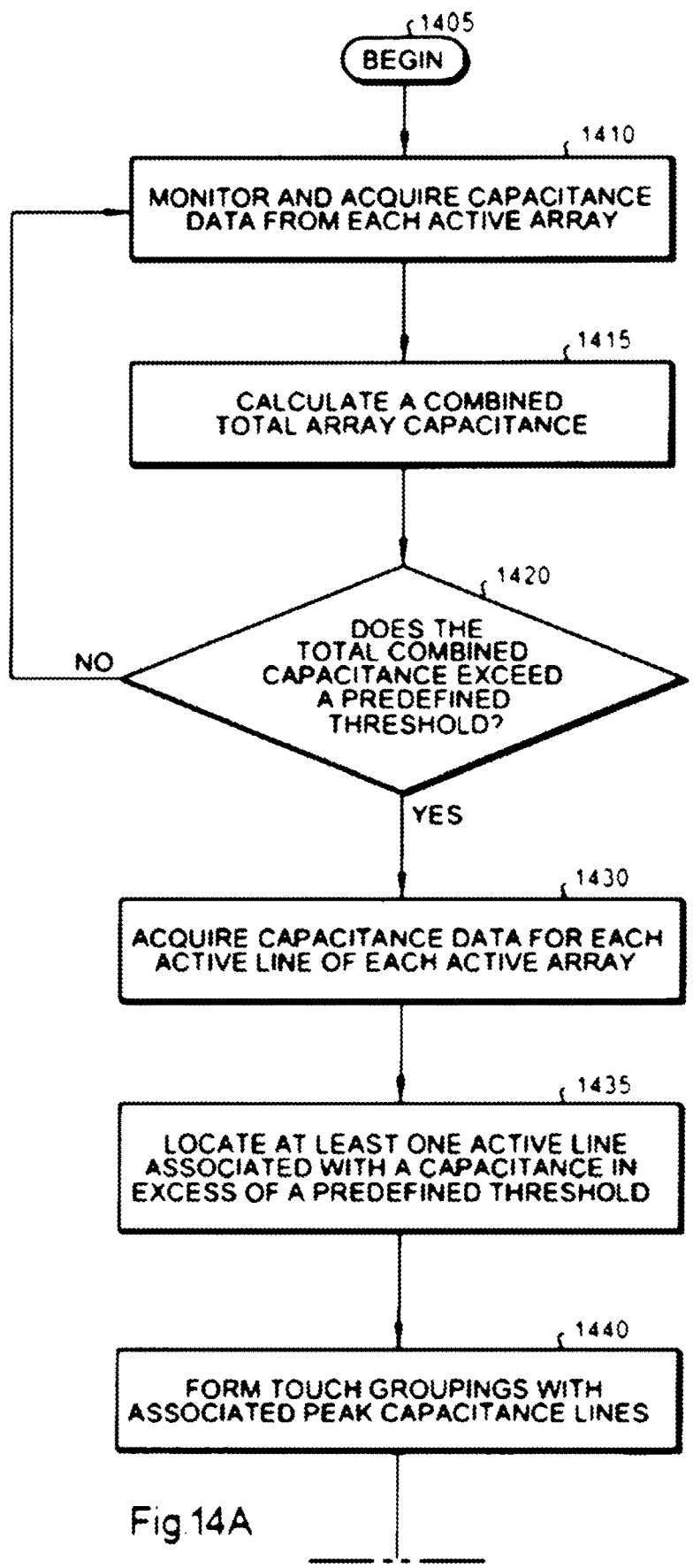
Figure 14B:
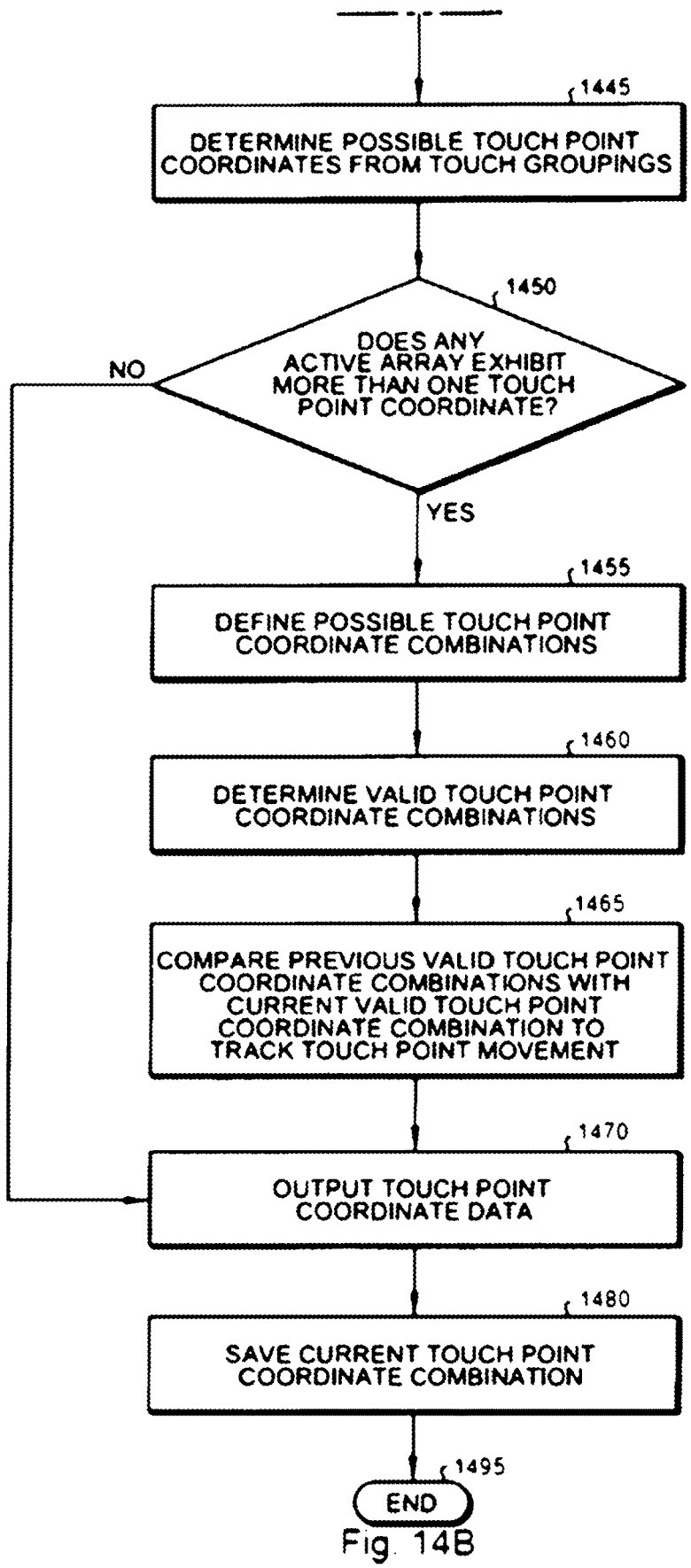

FIG. 14, copied from FIG. 10 in Ningrat, US App. 2010/0066701, expressly incorporated herein by reference, is a flowchart illustrating methods of implementing an exemplary process for identifying multiple touches in a multi array capacitance based touch screen.

In the following description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

As one skilled the relevant art will recognize, electronically stored data can be used by any type of microprocessor or similar computing system. For example, one or more portions of the present invention can be implemented in software. Software programming code which embodies the present invention is typically accessed by the microprocessor from long-term storage media of some type, such as a CD-ROM drive or hard drive. The software programming code may be embodied on any of a variety of known media for use with a data processing system, such as a diskette, hard drive, CD-ROM or the like. The code may be distributed on such media, or may be distributed from the memory or storage of one computer system over a network of some type to other computer systems for use by such other systems. Alternatively, the programming code may be embodied in the memory, and accessed by the microprocessor. The techniques and methods for embodying software programming code in memory, on physical media, and/or distributing software code via networks are well known and will not be further discussed herein.

Search Engine for 3D Models

Thomas Funkhouser discloses a search engine for 3d models. Thomas Funkhouser et al., "A Search Engine for 3D Models," ACM Transactions on Graphics, Vol. 22, Issue 1, pg. 83 (January 2003).

As the number of 3D models available on the Web grows, there is an increasing need for a search engine to help people and automatic processors find them. Unfortunately, traditional text-based search techniques are not always effective for 3D data. Funkhouser et al. investigated new shape-based search methods. The key challenges are to develop query methods simple enough for novice users and matching algorithms robust enough to work for arbitrary polygonal models. We present a web-based search engine system that supports queries based on 3D sketches, 2D sketches, 3D models, and/or text keywords. For the shape-based queries, Funkhouser developed a new matching algorithm that uses spherical harmonics to compute discriminating similarity measures without requiring repair of model degeneracies or alignment of orientations. It provides 46-245% better performance than related shape matching methods during precision-recall experiments, and it is fast enough to return query results from a repository of 20,000 models in under a second. The net result is a growing interactive index of 3D models available on the Web (i.e., a search engine for 3D models, which operates in a manner similar to Google or Microsoft Bing for text).

An important question then is how people will search for 3D models. Of course, the simplest approach is to search for keywords in filenames, captions, or context. However, this approach can fail: (1) when objects are not annotated (e.g., "B19745.wrl"), (2) when objects are annotated with specific or derivative keywords (e.g., "yellow.wrl" or "sarah.wrl"), (3) when all related keywords are so common that the query result contains a flood of irrelevant matches (e.g., searching for "faces"—i.e., human not polygonal), (4) when relevant keywords are unknown to the user (e.g., objects with misspelled or foreign labels), or (5) when keywords of interest were not known at the time the object was annotated.

In these cases and others, shape-based queries may be helpful for finding 3D objects. For instance, shape can combine with function to define classes of objects (e.g., round coffee tables). Shape can also be used to discriminate between similar objects (e.g., desk chairs versus lounge chairs). There are even instances where a class is defined entirely by its shape (e.g., things that roll). In these instances, "a picture is worth a thousand words."

Funkhouser investigates methods for automatic shape-based retrieval of 3D models. The challenges are two-fold. First, we must develop computational representations of 3D shape (shape descriptors) for which indices can be built and similarity queries can be answered efficiently. 3D databases may be searched using orientation invariant spherical harmonic descriptors. Second, user interfaces are provided in which untrained or novice users can specify shape-based queries, for example by 3D sketching, 2D sketching, text, and interactive refinement based on shape similarity.

In one embodiment, the 3D model search engine takes as input a query using any combination of typed keywords and sketches. For example, if a user wants a 3D model of a 2008 Volkswagen Beetle, the user could type "2008 Volkswagen Beetle" into the search engine or provide a standard 2D photograph or drawing of the vehicle as input to the search engine. In one embodiment, the first results of the search engine could be improved by calling a "find similar shape" or similar command.

Prior art content-based image retrieval (CBIR) systems, such as Query by Image Content developed by IBM Corporation in Armonk, N.Y., allow users to input a black and white or color image and find similar images in a database or on the Internet. These systems can be extended into 3D to allow users to search for 3D shapes and models.

Figure 16:
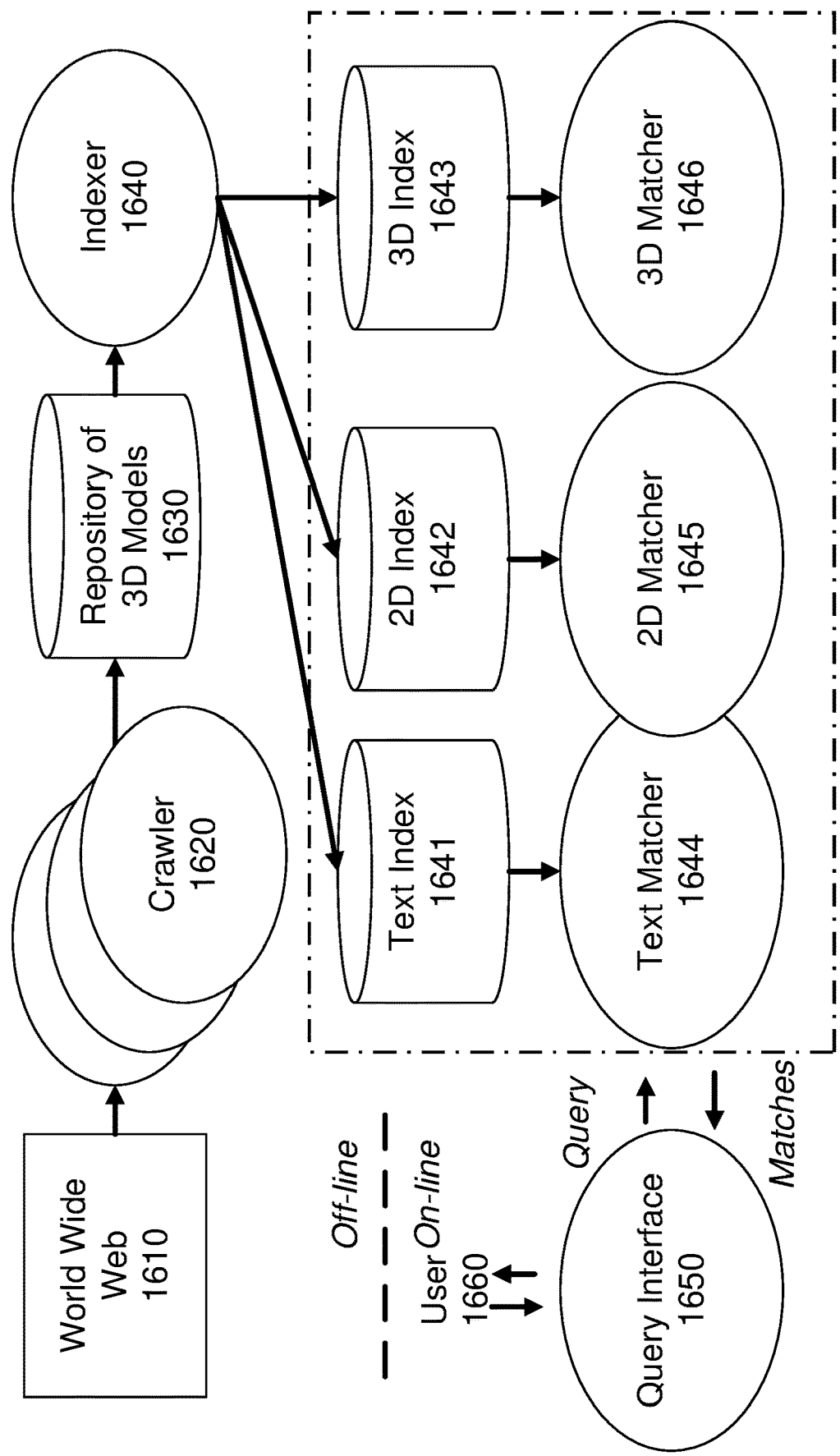
FIG. 16 illustrates a search engine for 3D models, according to one embodiment of the invention.

FIG. 16 illustrates a search engine for 3D models, according to one embodiment. A user 1660 communicates what she is looking for to a query interface 1650. In another embodiment (not illustrated) the user is an electronic machine rather than a human. The query interface 1650 converts the data into text, which is processed by a text matcher 1644, 2D image data, which is processed by a 2D matcher 1645, and 3D image data, which is processed by a 3D matcher 1646.

Information is then obtained from the World Wide Web 1610 in a crawler 1620, which stores a repository of 3D models 1630. The indexer 1640 then relies on a text index 1641, 2D index 1642, and 3D index 1643 to determine a match to the input to the query interface 1650, which is returned to the user 1660.

Three Dimensional Spatial Fourier Transform

J. R. Feinup discloses that an object may be reconstructed from the modulus of its Fourier transform. J. R. Feinup, "Reconstruction of an Object from the Modulus of its Fourier Transform," Optics Letters, Vol. 3, No. 1 (July 1978). Mitsuo Takeda describes a method of determining the topography of a scene using spatial Fourier transforms. Mitsuo Takeda, "Fourier-Transform Method of Fringe Pattern Analysis for Computer-Based Topography and Interferometry," J. Opt. Soc. Am., Vol. 72, No. 1 (January 1982).

Takeda proposes that in various optical measurements, we find a fringe pattern of the form:

$$g(x,y)=a(x,y)+b(x,y)\cdot\cos[2\pi f_0 x+\Phi(x,y)] \qquad (Eq.\ 1)$$

where the phase $\Phi(x,y)$ contains the desired information and $a(x,y)$ and $b(x,y)$ represent unwanted irradiance variations arising from the nonuniform light reflection or transmission by a test object; in most cases $a(x,y)$, $b(x,y)$ and $i(x,y)$ vary slowly compared with the variation introduced by the spatial-carrier frequency $f_0$.

The conventional technique has been to extract the phase information by generating a fringe-contour map of the phase distribution. In interferometry, for which Eq. (1) represents the interference fringes of tilted wave fronts, the tilt is set to zero to obtain a fringe pattern of the form:

$$g_0(x,y)=a(x,y)+b(x,y)\cdot\cos[\Phi(x,y)] \qquad (Eq.\ 2)$$

which gives a contour map of $\Phi(x,y)$ with a contour interval $2\pi$. In the case of moiré topography, for which Eq. (1) represents a deformed grating image formed on an object surface, another grating of the same spatial frequency is superposed to generate a moiré pattern that has almost the same form as Eq. (2) except that it involves other high-frequency terms that are averaged out in observation. Although these techniques provide us with a direct means to display a contour map of the distribution of the quantity to be measured, they have following drawbacks: (1) The sign of the phase cannot be determined, so that one cannot distinguish between depression and elevation from a given contour map. (2) The sensitivity is fixed at $2\pi$ because phase variations of less than $2\pi$ create no contour fringes. (3) Accuracy is limited by the unwanted variations $a(x,y)$ and $b(x,y)$, particularly in the case of broad-contour fringes. Fringe-scanning techniques have been proposed to solve these problems, but they require moving components, such as a moving mirror mounted on a translator, which must be driven with great precision and stability.

Takeda proposes a new technique that can solve all these problems by a simple Fourier-spectrum analysis of a non-contour type of fringe pattern, as given in Eq. (1).

First, a non-contour type of fringe pattern of the form given in Eq. (1) is put into a computer by an image-sensing device that has enough resolution to satisfy the sampling-theory requirement, particularly in the x direction. The input fringe pattern is rewritten in the following form for convenience of explanation:

$$g(x,y)=a(x,y)+c(x,y)\cdot\exp(2\pi i f_0 x)+c^*(x,y)\cdot\exp(-2\pi i f_0 x) \qquad (Eq.\ 3)$$

with $$c(x,y)=0.5\cdot b(x,y)\cdot\exp[i\Phi(x,y)] \qquad (Eq.\ 4)$$

where * denotes a complex conjugate.

Next, Eq. (3) is Fourier transformed with respect to x by the use of a Fast-Fourier-Transform (FFT) algorithm, which gives:

$$G(f,y)=A(f,y)+C(f-f_0,y)+C^*(f+f_0,y) \qquad (Eq.\ 5)$$

where the capital letters denote the Fourier spectra and f is the spatial frequency in the x direction. Since the spatial variations of $a(x,y)$, $b(x,y)$, and $\Phi(x,y)$ are slow compared with the spatial frequency fo, the Fourier spectra in Eq. (5) are separated by the carrier frequency $f_0$. We make use of either of the two spectra on the carrier, say $C(f-f_0,y)$, and translate it by $f_0$ on the frequency axis toward the origin to obtain $C(f,y)$. Note that the unwanted background variation a(x,y) has been filtered out in this stage. Again using the FFT algorithm, we compute the inverse Fourier transform of C(f,y) with respect to f and obtain c(x,y), defined by Eq. (4). Then we calculate a complex logarithm of Eq. (4):

$$\log[c(x,y)] = \log[0.5\ b(x,y)] + i\Phi(x,y) \quad (\text{Eq. 6})$$

Now we have the phase $\Phi(x,y)$ in the imaginary part completely separated from the unwanted amplitude variation b(x,y) in the real part. The phase so obtained is indeterminate to a factor of $2\pi$. In most cases, a computer-generated function subroutine gives a principal value ranging from $-\pi$ to $\pi$, as, for example. These discontinuities can be corrected by the following algorithm. We determine an offset phase distribution $\Phi_0(x,y)$ that should be added to the discontinuous phase distribution $\Phi_d(x,y)$ to convert it to a continuous distribution $\Phi_c(x,y)$:

$$\Phi_c(x,y) = \Phi_d(x,y) + \Phi_0(x,y) \quad (\text{Eq. 7})$$

The first step in making this determination is to compute the phase difference:

$$\Delta\Phi_d(x_i,y) = \Phi_d(x_i,y) - \Phi_d(x_{i-1},y)$$

between the ith sample point and the point preceding it, with the suffix i running from 1 to N to cover all the sample points. Since the variation of the phase is slow compared with the sampling interval, the absolute value of the phase difference $|\Delta\Phi_d(x_i,y)|$ is much less than $2\pi$, at points where the phase distribution is continuous. But it becomes almost $2\pi$ at points where the $2\pi$ phase jump occurs. Hence, by setting an appropriate criterion for the absolute phase difference, say $0.9 \times 2\pi$, we can specify all the points at which the $2\pi$ phase jump takes place and also the direction of each phase jump, positive or negative, which is defined as corresponding to the sign of $\Delta\Phi_d(x_i,y)$. The second step is to determine the offset phase at each sample point sequentially, starting from the point $x_0=0$. Since only a relative phase distribution needs to be determined, we initially set $\Phi_0^x(x_0,y)=0$. Then we set $\Phi_0^x(x_i,y)=\Phi_0^x(x_0,y)$ for $i=1, 2, 3, \ldots, k-1$ until the first phase jump is detected at the kth sample point. If the direction of the phase jump is positive, we set $\Phi_0^x(x_k,y)=\Phi_0 x(x_{k-1},y)-2\pi$, and if it is negative, we set $\Phi_0^x(x_k,y)=\Phi_0^x(x_{k-1},y)+2\pi$. Again, we start to set $\Phi_0^x(x_i,y)=\Phi_0^x(x_k,y)$ for $i=k+1, i=k+2, \ldots, i=m-1$, until the next phase jump occurs at the $m^{th}$ sample point, where we perform the same $2\pi$ addition or subtraction as at the $k^{th}$ sample point, with k now being replaced with in. Repeating this procedure of $2\pi$ phase addition or subtraction at the points of phase jump, we can determine the offset phase distribution the addition of which to $\Phi_d(x,y)$ gives a continuous phase distribution $\Phi_c(x,y)$. In the case of measurement over a full two-dimensional plane, a further phase-continuation operation in the y direction is necessary because we initially set $\Phi_0^x(x_0,y)=0$ for all y without respect to the phase distribution in the y direction. It is sufficient to determine an additional offset phase distribution in the y direction, $\Phi_0^y(x,y)$, on only one line along the y axis, say, on the line through the point $x=x_L$, L being arbitrary. This can be done by the same procedure as was described for the x direction, with the initial value now being set at $\Phi_0^y(x_L, y_0)=0$. The two-dimensional offset phase distribution is then given by:

$$\Phi_0(x,y) = \Phi_0^x(x,y) - \Phi_0^x(x_L,y) + \Phi_0^y(x_L,y) \quad (\text{Eq. 8})$$

In Eq. (8), $\Phi_0^x(x,y)-\Phi_0^x(x_L,y)$ represents the difference of the offset phase between the points (x,y) and $(x_L,y)$, and $\Phi_0^y(x_L,y)$ that between points $(x_L,y)$ and $(x_L,y_0)$, so that $\Phi_0(x,y)$ gives a relative offset phase distribution defined as the difference from the initial value at $(x_L,y_0)$.

This method developed by Takeda can be modified to from producing a topography of a region to producing a full 3D depth model of a region. The view of two dimensions of space is already known, and the third dimension can be derived from the topographic depth model. This topographic model can be converted into a full (x,y,z) depth model or a combination of a left eye view and a right eye view of a region.

Three Dimensional Audio Processing

The audio of many movies is developed by professional engineers to make the sound appear as though it is being heard at the viewer's position from a certain location where a speaker appears to be standing or from where a sound (e.g. siren, car engine, etc.) is coming. These calculations can be reverse engineered to ascertain an object representing a source of the sound and the position, velocity, and acceleration of the source of the sound. In one embodiment, these calculations are done in a graphics processor unit (GPU). In another embodiment, these calculations are done in the CPU of a computer running an operating system such as Windows 7, Apple Macintosh Os X or Linux.

Emmanuel Gallo discusses 3D audio processing provide improved audio rendering in Emmanuel Gallo, "Efficient 3D Audio Processing with the GPU," ACM Workshop on General Purpose Computing on Graphics Processors (2004).

Gallo notes that audio processing applications are among the most compute-intensive and often rely on additional DSP resources for real time performance. However, programmable audio digital signal processors (DSPs) are in general only available to product developers. Professional audio boards with multiple DSPs usually support specific effects and products while consumer "game-audio" hardware still only implements fixed-function pipelines which evolve at a rather slow pace.

The widespread availability and increasing processing power of GPUs offer an alternative solution. GPU features, like multiply-accumulate instructions or multiple execution units, are similar to those of most DSPs. Besides, 3D audio rendering applications require a significant number of geometric calculations, which are a perfect fit for the GPU.

GPU-Accelerated Audio Rendering

Gallo considered a combination of two simple operations commonly used for 3D audio rendering: variable delay-line and filtering. The signal of each sound source was first delayed by the propagation time of the sound wave. This involved resampling the signal at non-integer index values and automatically accounts for Doppler shifting. The signal was then filtered to simulate the effects of source and listener directivity functions, occlusions and propagation through the medium. Gallo resampled the signals using linear interpolation between the two closest samples. On the GPU this is achieved through texture resampling. Filtering may be implemented using a simple 4-band equalizer. Assuming that input signals are band-pass filtered in a pre-processing step, the equalization is efficiently implemented as a 4-component dot product. For GPU processing, Gallo stored the sound signals as RGBA textures, each component holding a band-passed copy of the original sound. Binaural stereo rendering requires applying this pipeline twice, using a direction-dependent delay and equalization for each ear, derived from head-related transfer functions (HRTFs). Similar audio processing was used to generate dynamic sub-mixes of multiple sound signals prior to spatial audio rendering (e.g. perceptual audio rendering).

Gallo compared an optimized SSE (Intel's Streaming SIMD Extensions) assembly code running on a Pentium 4 3 GHz processor and an equivalent Cg/OpenGL implementation running on an nVidia GeForce FX 5950 Ultra graphics board on AGP 8×. Audio was processed at 44.1 KHz using 1024-sample long frames. All processing was 32-bit floating point.

The SSE implementation achieves real-time binaural rendering of 700 sound sources, while the GPU renders up to 580 in one timeframe (approximately 22.5 ms). However, resampling floating-point textures requires two texture fetches and a linear interpolation in the shader. If floating-point texture resampling was available in hardware, GPU performance would increase. A simulation of this functionality on the GPU using a single texture-fetch achieved real-time performance for up to 1050 sources. For mono processing, the GPU treats up to 2150 (1 texture fetch)/1200 (2 fetches and linear interpretation) sources, while the CPU handles 1400 in the same amount of time.

Thus, although on average the GPU implementation was about 20% slower than the SSE implementation, it would become 50% faster if floating-point texture resampling was supported in hardware. The latest graphics architectures are likely to significantly improve GPU performance due to their increased number of pipelines and better floating-point texture support.

The huge pixel throughput of the GPU can also be used to improve audio rendering quality without reducing frame-size by recomputing rendering parameters (source-to-listener distance, equalization gains, etc.) on a per-sample rather than per-frame basis. This can be seen as an audio equivalent of per-pixel vs. per-vertex lighting. By storing directivity functions in cube-maps and recomputing propagation delays and distances for each sample, the GPU implementation can still render up to 180 sources in the same time-frame. However, more complex texture addressing calculations are needed in the fragment program due to limited texture size. By replacing such complex texture addressing with a single texture-fetch, we also estimated that direct support for large 1D textures would increase performance by at least a factor of two.

It is noted that current GPU systems are far faster than those analyzed by Gallo.

It is possible to reverse Gallo's method to determine a position, velocity, and acceleration of an object emitting a sound from the object (instead of the defining audio signal from the position, velocity, and acceleration, as discussed by Gallo). Therefore, one can use the GPU to determine the position of objects emitting sounds in two or three dimensions and construct a 2D or 3D model of a scene on this basis. In a typical television scene, there are many objects that emit sounds, for example, humans speak, dogs bark, cars emit engine noises, gun shots result in a sound coming from the source, etc. Thus, the reversal of Gallo's method is particularly useful.

Figure 17:
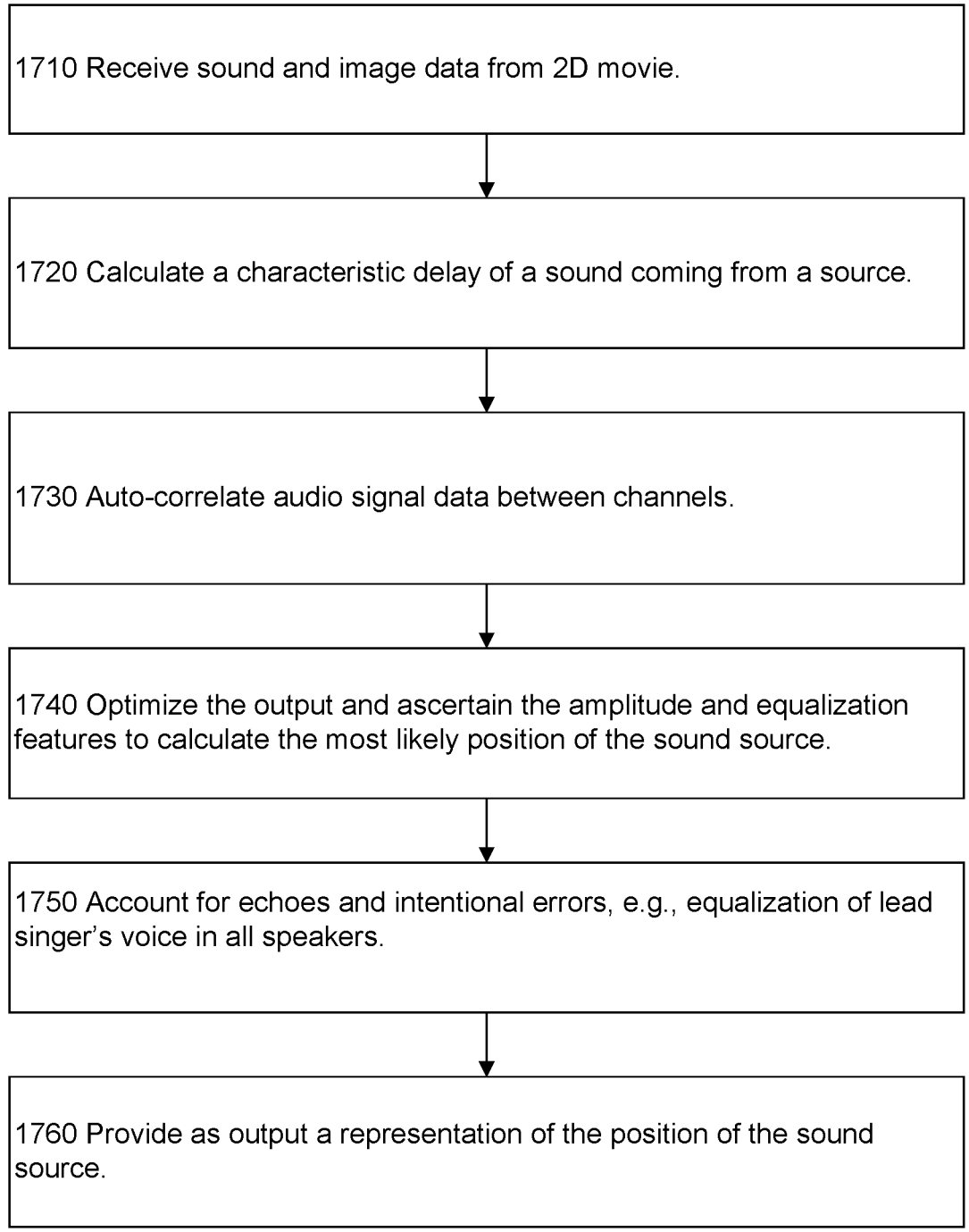
FIG. 17 illustrates a flow chart for a method of calculating a position of a sound source from sound and image data, which may be available in a MPEG or similar video file, according to an embodiment of the invention.

FIG. 17 illustrates a flow chart for a method of calculating a position of a sound source from sound and image data, which may be available in a MPEG or similar video file, according to an embodiment.

In step 1710, the processor implementing the method receives sound and image data from a 2D movie. It should be noted that the processor implementing the invention could be a modern computer, such as a HP Pavilion DV3 Running a Microsoft Windows 7 operating system or an Apple Macintosh Os X or Linux computer. In other embodiments, a graphics card having a GPU, internal to the monitor or an external graphics card in a Sony PlayStation, other video game console, or similar device is used.

In step 1720, the processor calculates a characteristic delay of a sound coming from a source.

In step 1730, the processor auto-correlates the audio signal data between channels in order to optimize the audio output and determine characteristic time-constants.

In step 1740, the processor optimizes the audio output and ascertains the amplitude and equalization features of the audio signal. This data is then used to calculate a most likely position of the sound source. It should be noted that, in some cases, two or more microphones might be recording the same or different sounds having the same characteristics. In this case, two or more positions, rather than one position, may be calculated.

In step 1750, the processor applies a correction to account for echoes and other errors. It is noted that some of the errors might be intentional. For example, in some music video recordings, the lead singers voice is equalized across all of the speakers while the lead singer is positioned in an arbitrary location of the screen, not corresponding to the source of his/her voice. In a preferred embodiment, the system recognizes these inconsistencies and uses other methods to ascertain a 3D model of the scene under these conditions. It is noted that, in some cases, a sound may be coming from two locations. For example, a rock band could include two guitarists playing at the same frequency but standing at different locations. There could also be two different microphones near the lead singer.

In step 1760, the processor provides as output a representation of the position of the sound source. This output is either submitted to another processor or to another module in the same processor for further processing for example, to develop a 3D screen representation of the scene.

Image Segmentation

Figure 18:
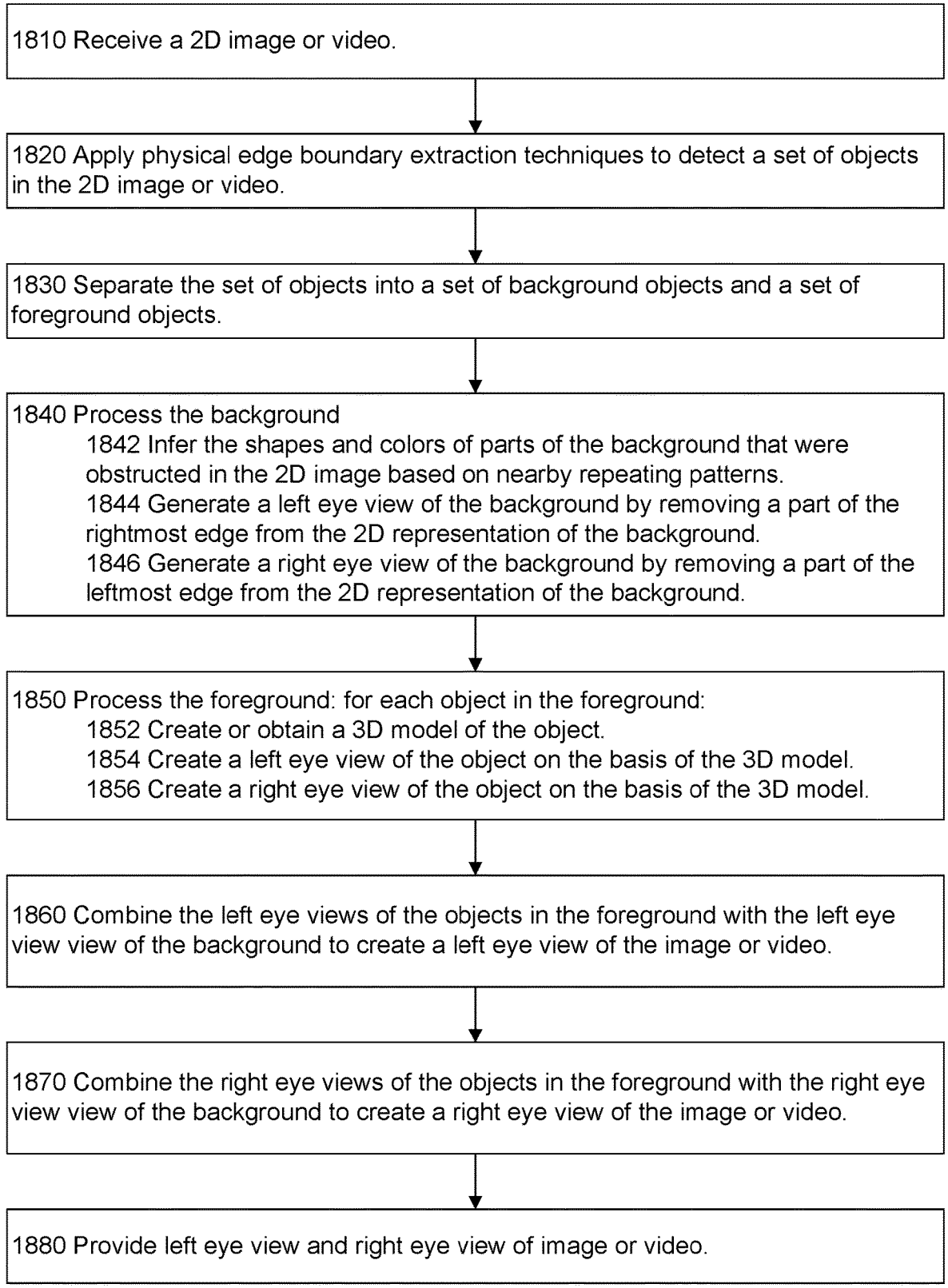
FIG. 18 illustrates a method of image segmentation, according to one embodiment of the invention.

FIG. 18 illustrates a method of image segmentation according to one embodiment.

In step 1810, the processor implementing the invention receives a 2D image or video. According to a preferred embodiment, the processor is a graphics processing unit (GPU) that can run single instruction, multiple data (SIMD) processing, such as in a Sony PlayStation connected to a monitor. In another embodiment, a full laptop computer, such as a HP Pavilion DV3 running Microsoft Windows 7, is used. In yet another embodiment, the GPU is internal to the monitor.

In step 1820, the processor applies edge boundary extraction techniques to detect a set of different objects in the 2D image or video. Edge boundary extraction techniques are described, for example, in U.S. Pat. Nos. 6,716,175, and 5,457,744, each of which is expressly incorporated herein by reference.

In step 1830, the processor separates the set of objects into a set of background objects and a set of foreground objects.

In step 1840, the processor processes the background image. Step 1842 involves inferring the shapes and color of parts of the background that are obscured in the 2D image by the foreground. This inference is made on the basis of nearby repeating patterns. For example, if a man is standing in front of a red brick wall with white clay between the bricks, it is very likely that the part of the wall that is obscured by the man has the same pattern. In step 1844, the processor generates a left eye view of the background by removing a part of the rightmost edge from the 2D representation of the background developed in step 1842. In step 1846, the processor generates a right eye view of the background by removing a part of the leftmost edge from the 2D representation of the background developed in step 1842.

In step 1850, the processor processes the objects in the foreground. For each object in the foreground, the processor creates or obtains a 3D model of the object 1852. Methods of creating or obtaining 3D models, either from a 2D image alone or in combination with a database or Internet search, are discussed elsewhere in this document. On the basis of this 3D model, the processor can now create a left eye view 1854 and a right eye view 1856 of the object.

In step 1860, the processor combines the left eye views of the objects in the foreground with the left eye view of the background to create a left eye view of the image or video. It is noted that some objects in the left eye view may obstruct other objects or the background.

In step 1870, the processor combines the right eye views of the objects in the foreground with the right eye view of the background to create a right eye view of the image or video. It is noted that some objects in the right eye view may obstruct other objects or the background.

In step 1880, the processor provides as output the left eye view and the right eye view of the image or video.

Figure 19:
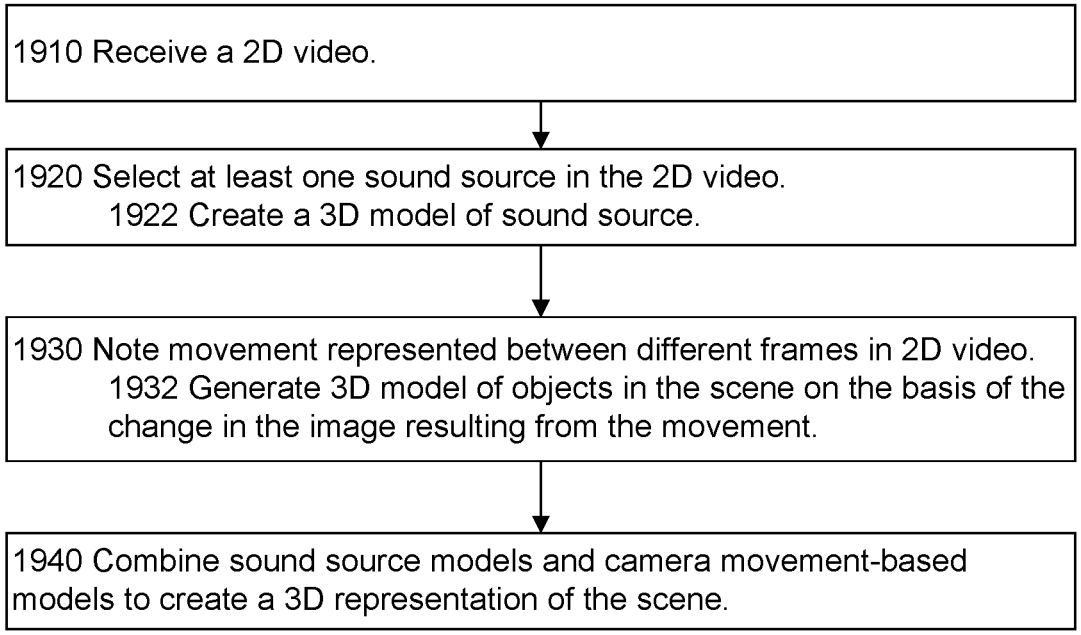
FIG. 19 illustrates a method of creating a 3D representation of at least a portion of a 2D video, according to an embodiment of the invention.

FIG. 19 illustrates a method of creating a 3D representation of at least a portion of a 2D video. The method of FIG. 19 takes advantage of the fact that many of the "interesting" objects in a video that need to be modeled in three dimensions usually produce sounds, e.g., speaking, barking, engine revving, etc., or are stationary, e.g. buildings, furniture, sculptures, etc.

In step 1910, the processor implementing the method receives a 2D video. According to a preferred embodiment, the processor is a graphics processing unit (GPU) that can run single instruction, multiple data (SIMD) processing, such as in a Sony PlayStation III connected to a monitor. In another embodiment, a full laptop computer, such as a HP Pavilion DV3 running Microsoft Windows 7, is used. In yet another embodiment, the GPU is internal to the monitor.

In step 1920, the processor selects at least one sound source in the 2D video. A method of ascertaining a sound source is described herein, for example, in FIG. 17. A 3D model of the sound source is then generated 1922. This model may be generated from the audio program, or from the 2D image, as noted herein, for example, in FIG. 16, and the discussion associated therewith.

In step 1930, the processor notes a movement of the camera (rather than an object in the scene external to the camera). Such a movement would provide at least two different views of stationary objects, and therefore would allow for a 3D model of the stationary objects in the scene to be developed. In step 1932, such a 3D model is developed on the basis of the change in the image resulting from the movement in the camera.

Finally, in step 1940, the sound source models and camera movement-based models are combined to create a 3D representation of the scene.

Figure 20:
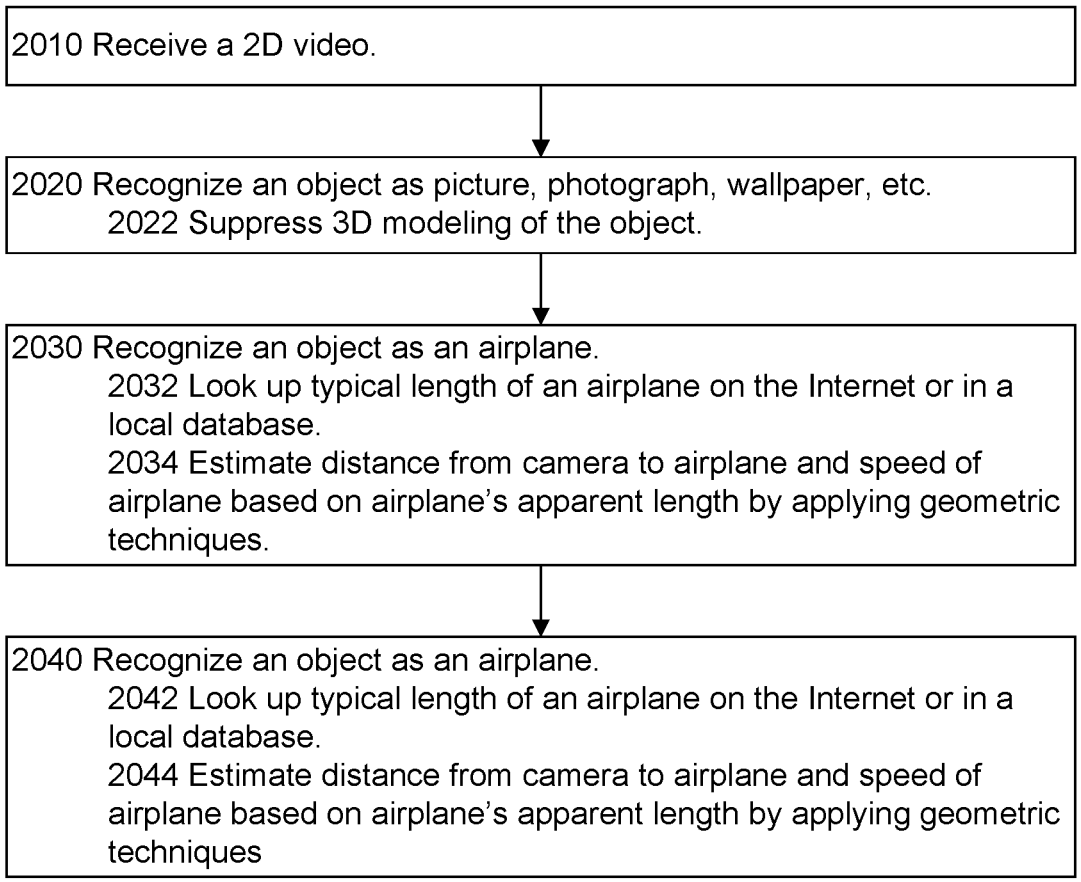
FIG. 20 illustrates a method of developing a three dimensional video from a two dimensional video, according to an embodiment of the invention.

FIG. 20 illustrates a method of developing a three dimensional video from a two dimensional video.

In step 2010, the processor receives a 2D video. In step 2020, the processor applies physical edge boundary extraction techniques to detect a set of objects. These steps and the types of processors that can implement the method have been described in detail above.

In step 2020, the processor recognizes an object as a two dimensional picture, photograph, wallpaper, television or computer screen, etc. In a preferred embodiment, these images would still appear in two dimensions. For example, if a video is being taken in an office where there is a photograph of a man and a woman at a beach on the desk, the desk, chair, computer, etc. in the office would all appear in 3D, but the photograph and the people and objects depicted therein would remain 2D. Therefore, in a preferred embodiment, the processor suppresses the three dimensional modeling of the object that should remain in two dimensions 2022.

A known problem in the art of automatic 2D-to-3D conversion is ascertaining the size and position of an object when there are no visual cues available. For example, when a person sees a white sphere in an otherwise completely dark, black scene it is impossible to tell whether the sphere is a small ball that is close to the viewer or a large ball that is far away from the viewer. Only the ratio of the size of the sphere to the distance from the viewer can be readily ascertained. In other words, it is impossible to tell whether the sphere is a fly-size sphere a few feet away or an airplane-size sphere a mile away. There needs to be a method of ascertaining the identity of the object (fly or airplane) in order to ascertain its likely size, and to predict its distance from the viewer in light of this knowledge of size.

In step 2030, an object is recognized as an airplane. Object recognition techniques based on 2D models are known in the art. See, e.g., U.S. Pat. Nos. 6,069,696, and 7,403,641, each expressly incorporated herein by reference. The processor "knows," either based on a local database or an Internet search, the typical size of an airplane 2032. The processor also "knows" the length that the airplane appears. Based on this information, the distance from the processor to the airplane can be calculated by applying basic geometric techniques 2034.

In step 2040, an object is recognized as a fly. The processor "knows," either based on a local database or an Internet search, the typical size of a fly 2042. The processor also "knows" the length that the fly appears. Based on this information, the distance from the processor to the fly can be calculated by applying basic geometric techniques 2044. A representation of the fly can then be added to the 3D model of the scene.

Hardware Overview

Figure 4:
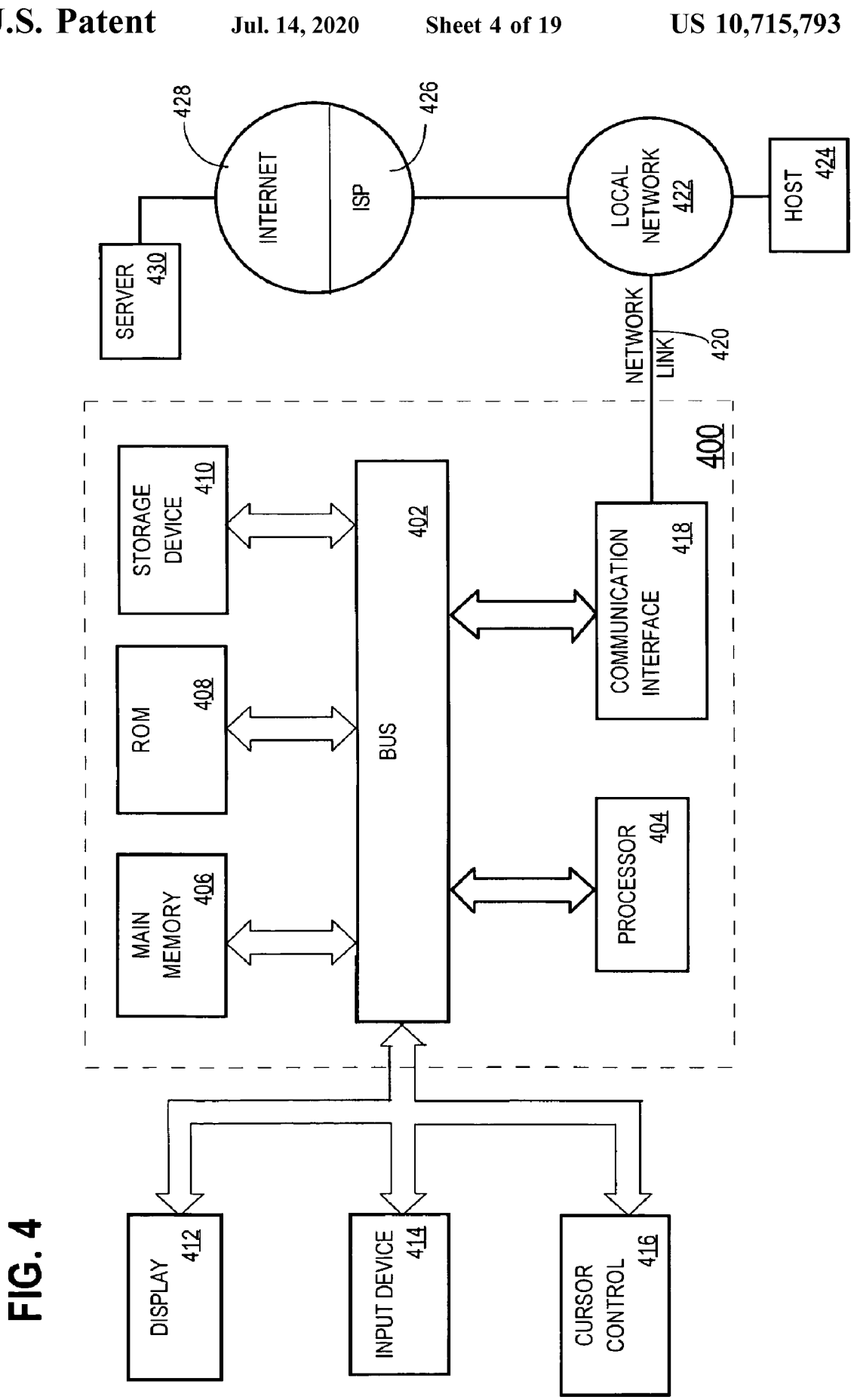
FIG. 4 illustrates a computer system that could be used to implement the invention.

FIG. 4, copied from U.S. Pat. No. 7,702,660, issued to Chan, is a block diagram that illustrates a computer system 400 upon which an embodiment of the invention may be implemented.

Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hardwired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an Integrated Services Digital Network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In this description, several preferred embodiments of the invention were discussed. Persons skilled in the art will, undoubtedly, have other ideas as to how the systems and methods described herein may be used. It is understood that this broad invention is not limited to the embodiments discussed herein. Rather, the invention is limited only by the following claims.

The invention claimed is:

1. A method of converting a 2D video file to a 3D representation, comprising:
   receiving a 2D video file comprising audio information and a plurality of visual objects in a scene having relative motion with respect to each other, at least one of the visual objects being associated with emission of a sound;
   automatically calculating a distance and an angle of a viewer with respect to the scene;
   calculating at least one characteristic delay of the sound in the audio information coming from a respective visual object in the 2D video file, based on at least one autocorrelation of a component of the audio information with a movement of the respective visual object in the 2D video file;
   assigning a depth to the plurality of visual objects within the 2D video file based on the at least one characteristic delay;
   applying at least one transform to the 2D video file, to produce a 3D representation of the scene as a series of pairs of parallax images and associated audio information for the viewer over time, dependent on the relative motion, the assigned depth of the plurality of visual objects, and the automatically calculated distance and angle, comprising distinct parallax values for each of the respective plurality of visual objects and modified audio information;

storing the 3D representation of the scene in a memory.

2. The method of claim 1, further comprising automatically determining the distance and the angle of the viewer with respect to the scene by an automated sensor.

3. The method according to claim 2, wherein the automated sensor comprises a camera.

4. The method according to claim 1, wherein the scene is presented on a screen, and the distance and the angle of the viewer with respect to the scene is determined with respect to the screen.

5. The method of claim 1, wherein the at least one transform comprises a 3D to parallax 2D transform.

6. The method according to claim 1, wherein the at least one transform is a perspective algorithm dependent on at least one vanishing line and at least one vanishing point.

7. The method according to claim 1, further comprising synthesizing a view of a respective visual object from a plurality of two dimensional images.

8. The method according to claim 1, wherein at least one visual object of the plurality of visual objects is automatically identified in an image by automated pattern recognition, and information describing the at least one automatically identified visual object is accessed from a repository based on the automatic identification.

9. The method according to claim 1, wherein the scene comprises a game.

10. The method according to claim 1, wherein the scene comprises an image generated by a 2D camera.

11. The method according to claim 1, further comprising:
analyzing the 2D video file for occlusion of respective visual objects, and parallax relations due to relative motion between an imager of the 2D video file and the respective visual objects,
wherein the assigned depth of the plurality of visual objects is further dependent on the occlusion and the parallax relations.

12. A system for converting a 2D video file to a 3D representation, comprising:
an input port configured to receive a 2D video file comprising audio information and a plurality of visual objects in a scene having relative motion with respect to each other, at least one of the visual objects being associated with emission of a sound;
at least one automated processor configured to:
calculate a distance and an angle of a viewer with respect to the scene;
calculate at least one characteristic delay of the sound in the audio information coming from a respective visual object in the 2D video file, based on at least one autocorrelation of a component of the audio information with a movement of the respective visual object in the 2D video file;
assign a depth to the plurality of visual objects within the 2D video file based on the at least one characteristic delay;
apply at least one transform to the 2D video file, to produce a 3D representation of the scene as a series of pairs of parallax images and associated audio information for the viewer over time, dependent on the relative motion, the assigned depth of the plurality of visual objects, and the calculated distance and angle, comprising distinct parallax values for each of the respective plurality of visual objects and modified audio information; and
a memory configured to store the 3D representation of the scene.

13. The system according to claim 12, further comprising an automated sensor configured to determine the distance and the angle of the viewer with respect to the scene.

14. The system according to claim 12, wherein the at least one processor is further configured to determine at least one vanishing line and at least one vanishing point for the scene.

15. The system according to claim 12, wherein the at least one processor is further configured to synthesize a view of a respective visual object from a plurality of 2D images.

16. The system according to claim 12, wherein the at least one processor is further configured to automatically identify at least one visual object of the plurality of visual objects in a series of images by automated pattern recognition, and to access information describing the at least one visual object from a repository.

17. The system according to claim 16, wherein the at least one processor is further configured to present the stored 3D representation of the scene comprising the series of pairs of parallax images and the associated audio information to the viewer.

18. A method of converting a motion image to a 3D motion representation, comprising:
receiving a motion image of a scene, comprising a plurality of moving objects associated with emission of sounds;
calculating a distance and an angle of a viewer with respect to the scene;
determining characteristic delays of sounds emitted from the plurality of moving objects, based on at least correlation of the sounds with a movement of respective objects;
assigning respective depths to the plurality of objects based on the characteristic delays;
transforming the motion image to produce the 3D motion representation, as a series of pairs of parallax images of respective objects and associated sounds emitted by the respective objects for the viewer, the 3D motion representation being dependent on the motion of the objects in the scene, the assigned respective depths, the calculated distance and angle of the viewer with respect to the scene, and the characteristic delays; and
storing the 3D motion representation in a memory.

19. The method according to claim 18, wherein the scene is presented on a display screen, and the distance and the angle of the viewer with respect to the scene is determined with respect to the screen.

20. The method according to claim 18, wherein the series of pairs of parallax images are produced by a perspective algorithm dependent on at least one vanishing line and at least one vanishing point.

* * * * *